US012372054B2

(12) United States Patent
Denniss

(10) Patent No.: US 12,372,054 B2
(45) Date of Patent: Jul. 29, 2025

(54) APPARATUS AND METHOD FOR EXTRACTING ENERGY FROM A FLUID

(71) Applicant: Wave Swell Energy Limited, Hornsby (AU)

(72) Inventor: Thomas Denniss, Hornsby (AU)

(73) Assignee: WAVE SWELL ENERGY LIMITED (AU)

( * ) Notice: Subject to any disclaimer, the term of this patent is extended or adjusted under 35 U.S.C. 154(b) by 218 days.

(21) Appl. No.: 18/144,404

(22) Filed: May 8, 2023

(65) Prior Publication Data

US 2023/0272771 A1    Aug. 31, 2023

Related U.S. Application Data

(63) Continuation of application No. 16/342,888, filed as application No. PCT/AU2017/051122 on Oct. 17, 2017, now Pat. No. 11,644,004.

(30) Foreign Application Priority Data

Oct. 17, 2016  (AU) ................................ 2016904200
Aug. 26, 2017  (AU) ................................ 2017903451

(51) Int. Cl.
*E02B 9/08*     (2006.01)
*F03B 13/14*    (2006.01)
*F03B 13/24*    (2006.01)

(52) U.S. Cl.
CPC ................ *F03B 13/24* (2013.01); *E02B 9/08* (2013.01); *F03B 13/142* (2013.01);
(Continued)

(58) Field of Classification Search
CPC ........... E02B 9/08; F03B 13/142; F03B 13/24
(Continued)

(56) References Cited

U.S. PATENT DOCUMENTS 2,641,108 A  *  6/1953  Montgomery ........ F03B 13/141
                                                     405/76
4,189,918 A     2/1980  Moody et al.
(Continued)

FOREIGN PATENT DOCUMENTS

AU       2017344743 A1 *  11/2018  ............... E02B 9/08
AU       2021322818 A1 *   3/2023  ............... E02B 9/08
(Continued)

*Primary Examiner* — Frederick L Lagman
(74) *Attorney, Agent, or Firm* — MORRISS O'BRYANT COMPAGNI CANNON, PLLC

(57) ABSTRACT

An apparatus and method is disclosed for extracting energy from an oscillating working fluid, such as ocean waves. The apparatus (10) comprises an internal flow passage (40) for the working fluid, a turbine (44) and a flow control device (38), each of the turbine (44) and the flow control device (38) being in direct fluid communication with the flow passage (40), wherein in use the flow control device (38) is selectively moveable between a first configuration in which the flow control device (38) is open to allow a flow of the working fluid, such as air, to exit the flow passage (40) therethrough, and a second configuration in which the flow control device (38) restricts a flow of the working fluid therethrough. In such an instance, the working fluid then must enter the flow passage (40) via the turbine (44), which can be harnessed to generate electricity.

14 Claims, 13 Drawing Sheets

(52) U.S. Cl.
CPC ..... *F05B 2210/12* (2013.01); *F05B 2210/404* (2013.01); *F05B 2250/02* (2013.01)

(58) Field of Classification Search
USPC ...................................... 405/76, 77
See application file for complete search history.

(56) References Cited

U.S. PATENT DOCUMENTS

| | | | | |
|---|---|---|---|---|
| 4,561,133 | A * | 12/1985 | Laing .................. | A63B 69/125 |
| | | | | 4/491 |
| 4,564,312 | A | 1/1986 | Saiz | |
| 4,741,157 | A | 5/1988 | Nishikawa | |
| 6,935,808 | B1 | 8/2005 | Dempster | |
| 7,470,087 | B2 * | 12/2008 | Liou ..................... | E02B 3/06 |
| | | | | 405/25 |
| 10,161,379 | B2 * | 12/2018 | Nanehkaran ......... | E02B 9/08 |
| 11,644,004 | B2 * | 5/2023 | Denniss ................ | E02B 9/08 |
| | | | | 417/330 |
| 12,146,464 | B2 * | 11/2024 | Denniss ............... | F03B 13/142 |
| 2005/0207844 | A1 * | 9/2005 | Boccotti ............... | F03B 13/142 |
| | | | | 405/110 |
| 2008/0175667 | A1 | 7/2008 | Liou | |
| 2012/0237298 | A1 * | 9/2012 | Cook .................... | E02B 9/08 |
| | | | | 405/76 |
| 2014/0183122 | A1 | 7/2014 | Canals et al. | |

FOREIGN PATENT DOCUMENTS

| | | | |
|---|---|---|---|
| CA | 2499018 A1 | 9/2006 | |
| CA | 2819701 A1 | 6/2011 | |
| CN | 105003384 A | 10/2015 | |
| DE | 4345270 A1 * | 6/1995 | ............ F03B 13/142 |
| EP | 2123903 A1 | 11/2009 | |
| GB | 2429243 A | 2/2007 | |
| GB | 2439643 A | 1/2008 | |
| JP | 852006849 A | 1/1977 | |
| JP | S058588 B2 | 1/1983 | |
| JP | 860215907 A | 10/1985 | |
| JP | 863198782 A | 8/1988 | |
| JP | 2010507041 A | 3/2010 | |
| JP | 201336376 A | 2/2013 | |
| JP | 2015040540 A | 3/2015 | |
| WO | 2015173235 A1 | 11/2015 | |

* cited by examiner

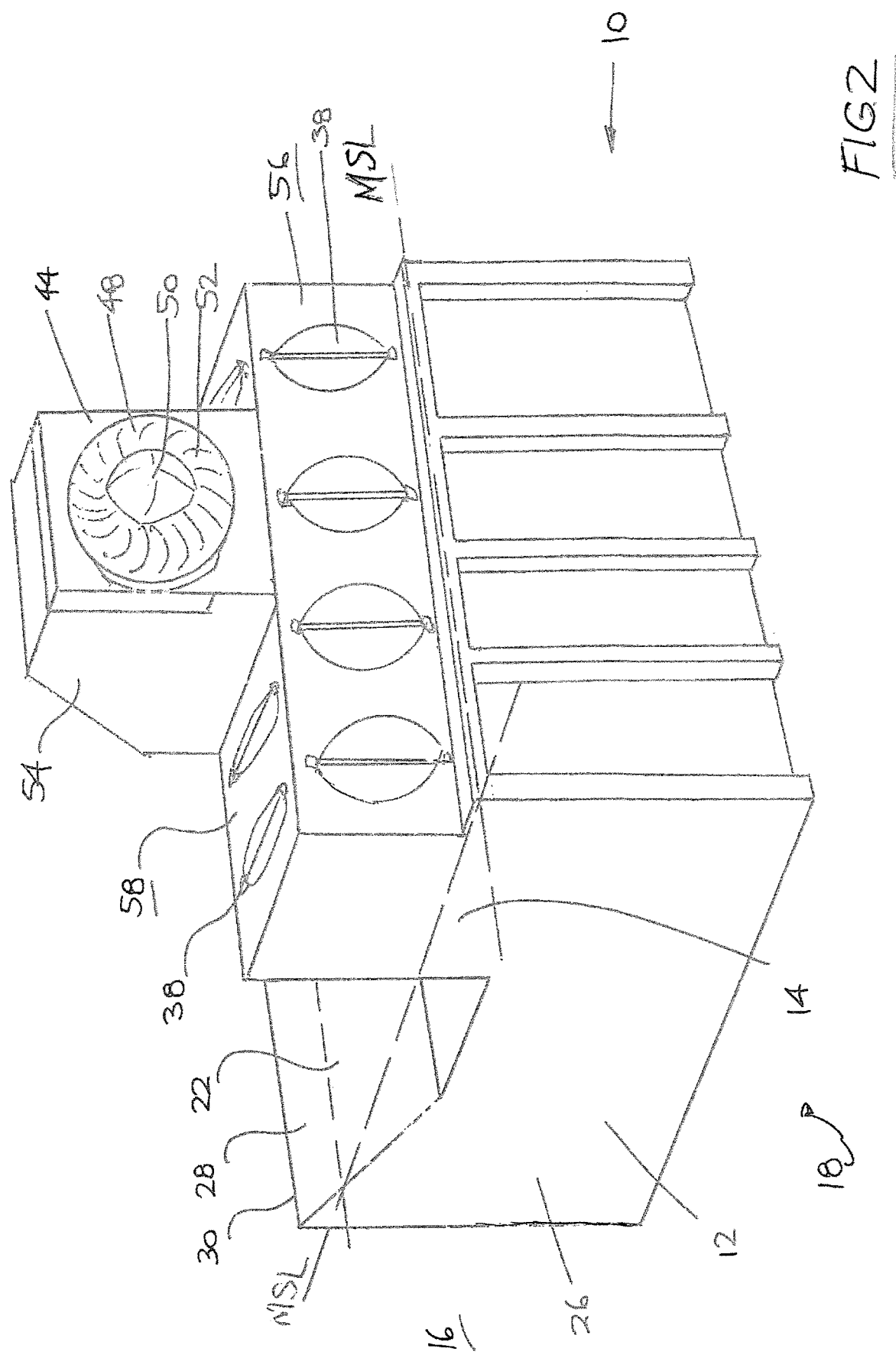

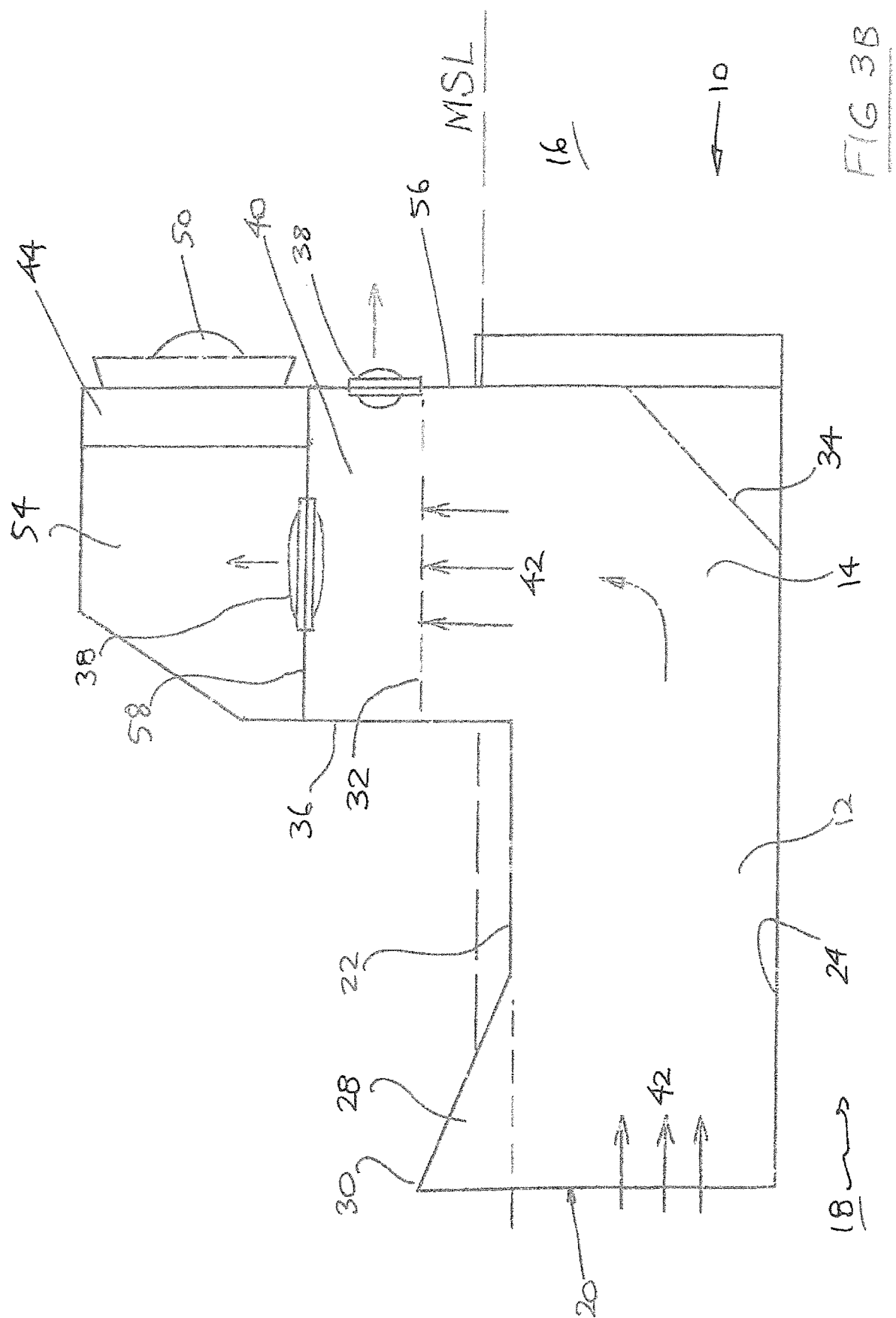

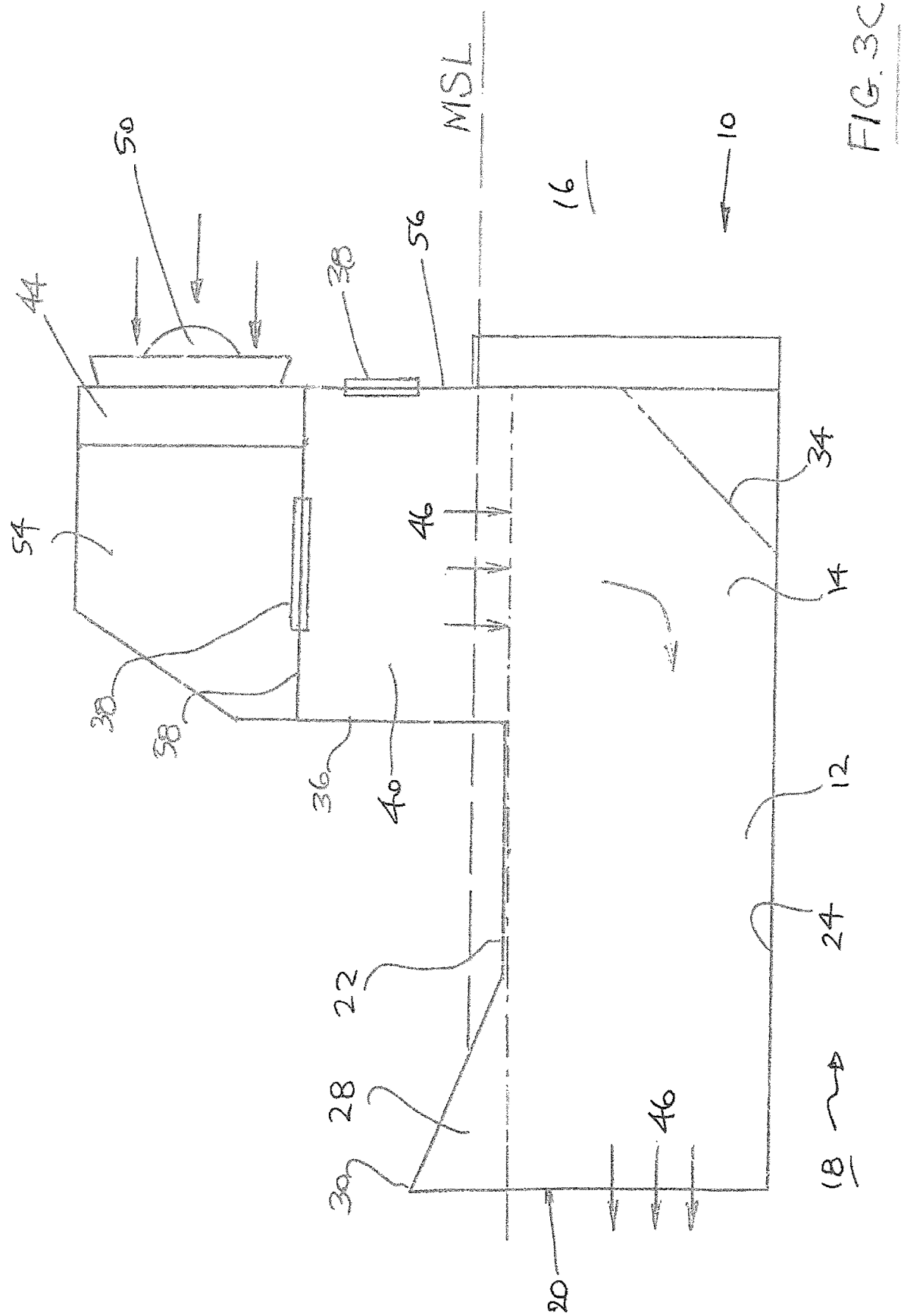

APPARATUS AND METHOD FOR EXTRACTING ENERGY FROM A FLUID

CROSS-REFERENCE TO RELATED APPLICATIONS

This application is a continuation of U.S. patent application Ser. No. 16/342,888 filed Apr. 17, 2019, now U.S. Pat. No. 11,644,004.

TECHNICAL FIELD

This disclosure relates generally to energy generation and more particularly, but not exclusively, to energy generation using ocean wave energy extraction systems. The disclosure is concerned with the design of the apparatus as well as methods for optimising the capture of energy from such apparatus.

BACKGROUND OF THE DISCLOSURE

Numerous types of wave power generation systems have been proposed in the art. Such systems are based on the principle of using the motion of waves to cause a rotary movement of a turbine to drive a generator to produce electricity. Known wave power generation systems employ one or more fluid flow ducts for containing oscillating water columns (OWC) connected to a turbine. In such systems there is frequently reversing air flow conditions present caused by displacement of the air in a duct, as a result of the oscillatory motion of the waves in the OWC caused by inward and outward flows of waves. These turbines often have the disadvantage that they are complex in configuration and expensive to manufacture, and cannot withstand the harsh environmental conditions (salt water, high or rough seas bringing large or unpredictable forces) over long periods of time. Many of these prior systems operate at low efficiency due to losses when converting the motion of the OWC into rotational mechanical energy in the bidirectional turbines.

There is a need for an improved system design which can capture energy from OWC in an efficient manner, and which can lower the costs of performing such a task.

SUMMARY

In a first aspect, embodiments are disclosed on an apparatus for extracting energy from an oscillating working fluid, the apparatus comprising a flow passage for the working fluid, a turbine and a flow control device, each of the turbine and the flow control device being in direct fluid communication with the flow passage, wherein in use the flow control device is selectively moveable between a first configuration in which the flow control device is open to allow a flow of the working fluid to exit the flow passage therethrough, and a second configuration in which the flow control device restricts a flow of the working fluid therethrough, such that the working fluid enters the flow passage via the turbine.

In certain embodiments, the flow control device changes the configuration of access to the flow passage in response to changes in the pressure and/or direction of flow of the oscillating working fluid.

In certain embodiments, the flow control device is fully closable so as to facilitate the flow of working fluid solely via the turbine in the second configuration.

In certain embodiments, the flow control device is fitted with a control mechanism to control its movement between the first and second configurations. In one form of this, the flow control device has an element which is moveable by the control mechanism to become open and closed to the flow of working fluid. In particular forms of this, the element is one of hingedly, slidably or rotatably moveable, and is of a shape which covers a cross-sectional opening passage of the flow control device.

In certain embodiments, the flow control device is one of a butterfly valve or a check valve.

In certain embodiments, the turbine includes a rotor comprising a central hub and a plurality of blades arranged about and extending from the periphery of the hub, the rotor disposed within a housing connected to the flow passage, whereby the shape of the blades and their orientation in relation to the hub facilitates unidirectional rotation of the turbine rotor in response to a unidirectional axial flow of working fluid through the housing. In one form of this, an electric generator is configured for rotation by the turbine to generate electrical energy. In one particular embodiment, a drive shaft is coupled to the hub at its proximal end and to the electric generator at its distal end.

In certain embodiments, the working fluid is air, and the flow of the air is generated by oscillations of an oscillating water column which is in fluid communication with the flow passage, and which is located in a duct.

In certain embodiments, the duct comprises: (a) a first portion arranged in use to be substantially submerged below the mean surface level (MSL) of a body of water in which it is located, the first portion having an opening arranged for receiving an incoming wave from the body of water, and (b) a second portion which depends from the first portion and which is arranged in use to extend above the MSL, the second portion for receiving water from the incoming wave after it flows through the first portion, wherein the flow passage is defined by a region of the second portion which extends above a maximum level of water received from the incoming wave after it flows through the first portion.

In one form of this, the first and second portions of the duct are joined via a flow direction control segment intermediate the first and second portions, the flow direction control segment is defined by a planar sloped portion arranged at the junction of and extending between the first and second portions.

In one particular embodiment, the first and second portions of the duct are generally elongate conduits, the first portion having a cross-sectional area greater than the cross-sectional area of the second portion. In one form of this, the cross-sectional area at the opening of first portion is of a greater cross-sectional area than the remainder of the first portion, the conduit tapering down in cross-sectional area when moving in a direction from an outer entry mouth region at the opening toward the second portion, so as to accelerate the flow of incoming waves from the body of water into the duct. In one particular embodiment, the outer entry mouth region of the first portion is arranged in use to extend above the MSL of a body of water in which it is located, so as to capture a greater flow of incoming waves from the body of water into the duct.

In certain embodiments, the duct is operable to rest on the floor of the body of water in which it is disposed.

In a second aspect, embodiments are disclosed of a wave energy extraction system, the system including:
(a) at least one duct for receiving an oscillating water column, the duct comprising: (i) a first portion arranged in use to be substantially submerged below the mean surface level (MSL) of a body of water in which it is located, the first portion having an opening arranged for receiving an incoming wave from the body of water, and (ii) a second portion which depends from the first portion and which is arranged in use to extend above the MSL, the second portion for receiving water from the incoming wave after it flows through the first portion, such that in use an oscillating water column is established within the duct as a result of repeated movement of water into and out of the duct, the flow of water out of the duct also being via the opening, but in a direction opposite to the direction of the incoming wave;

(b) a rotatable air turbine which is in direct fluid communication with a flow passage located within the second portion of the duct; and (c) at least one flow control device which is also in direct fluid communication with the said flow passage, the flow control device being arranged in use to move between a first configuration in which the device is open, allowing a flow of displaced air to exit the flow passage when the oscillating water column is received into the second portion of the duct, and then to a second configuration in which the device restricts air flowing into the second portion, whereupon, as the oscillating water column flows out of the duct in the said opposite direction, a flow of air is drawn back into the flow passage via the rotatable air turbine.

In certain embodiments, the flow control device changes the configuration of access to the second portion in response to changes in the pressure and/or direction of flow of the oscillating working fluid.

In certain embodiments, the system further includes an electric generator configured for rotation by the turbine to generate electrical energy. In one form of this, the turbine includes a rotor comprising a central hub and a plurality of blades arranged about and extending from the periphery of the hub, the rotor disposed within a flow passage connected to the second portion, whereby the shape of the blades and their orientation in relation to the hub facilitates unidirectional rotation of the turbine rotor in response to axial air flow through the flow passage into the second portion. In one particular form of this, a drive shaft is coupled to the hub at its proximal end and to the electric generator at its distal end.

In certain embodiments, the frequency of the oscillating water column in use can be varied by changing the cross-sectional area of the flow control device(s) as a proportion of the surface area of the second portion which extends above the MSL, by the selective movement of one or more of the flow control device(s) between the first and second configurations. In one form of this, the cross-sectional area of the flow control device(s) as a proportion of the surface area of the second portion which extends above the MSL, is arranged to be less than 15 percent. In a particular form of this, the said proportion is arranged to be less than 10 percent.

In certain embodiments, the system of the second aspect includes the apparatus as defined in the first aspect.

In a third aspect, embodiments are disclosed of a method of controlling the frequency of movement of water in an oscillating water column to substantially correspond to the frequency of an incoming and outgoing wave from a body of water which is in fluid communication with the column, the method comprising the steps of:

(a) arranging a duct for receiving the oscillating water column, the duct comprising: (i) a first portion arranged in use to be substantially submerged below the mean surface level (MSL) of the body of water in which it is located, the first portion having an opening arranged for receiving the incoming wave from the body of water, and (ii) a second portion which depends from the first portion and which is arranged in use to extend above the MSL, the second portion for receiving water from the incoming wave after it flows through the first portion, such that the oscillating water column is established in use within the duct as a result of repeated movement of water into and out of the duct, the flow of water out of the duct also being via the opening, but in a direction opposite to the direction of the incoming wave; and (b) changing the configuration of at least one flow control device which is in direct fluid communication with a flow passage at an interior of the second portion of the duct which extends above the MSL, said device(s) arranged in use to move between a first configuration in which the device is open, allowing a flow of displaced air to exit the flow passage in the second portion when the oscillating water column is being received into the duct, and a second configuration in which the device restricts air flowing therethrough into the flow passage in the second portion; such that the frequency of the oscillating water column which flows into and out of the duct substantially corresponds to the frequency of the incoming and outgoing wave from the body of water.

In certain embodiments, the method further comprises the step of continuously adjusting the configuration of the at least one flow control device(s) in response to changes in the frequency of the incoming and outgoing wave, by means of a control mechanism. In one form of this, in use the control mechanism selectively moves one or more of the flow control device(s) between the first and second configurations.

In certain embodiments, the duct, the flow control device and the control mechanism of the third aspect are as defined in the first aspect.

In a fourth aspect, embodiments are disclosed of a duct for receiving an oscillating water column, the duct comprising: (a) a first portion arranged in use to be substantially submerged below the mean surface level (MSL) of the body of water in which it is located, the first portion comprising a conduit having an opening arranged for receiving the incoming wave from the body of water, and (b) a second portion comprising a further conduit which depends from the first portion and which is arranged in use to extend above the MSL, the second portion for receiving water from the incoming wave after it flows through the first portion, wherein an entry mouth at the opening of the first portion is arranged in use to partially extend above the MSL of a body of water in which it is located, so as to capture a greater flow of incoming waves from the body of water into the duct.

In certain embodiments, the first portion has a greater cross-sectional area at the opening than the remainder of the first portion, the conduit tapering down in cross-sectional area when moving in a direction from the entry mouth at the opening toward the second portion, so as to accelerate the flow of incoming waves from the body of water into the duct. In one form of this, the uppermost and outermost in use region of the entry mouth of the first portion is arranged in use to partially extend above the MSL of the body of water. In one particular form, an uppermost surface of the first portion slopes downwardly when moving in a direction from the entry mouth at the opening toward the second portion.

In certain embodiments, the duct of the fourth aspect is otherwise as defined in the first aspect.

In a fifth aspect, embodiments are disclosed of apparatus for extracting energy from an oscillating working fluid, the apparatus including: a housing defining a flow passage for the working fluid; an energy conversion unit disposed at the housing, in fluid communication with the working fluid in the flow passage in use; and a flow control means which is in fluid communication with the flow passage, in use for selectively changing the configuration of the flow passage between an active configuration in which the working fluid acts on the energy conversion unit, and a bypass configuration in which the working fluid bypasses the energy conversion unit.

In certain embodiments, in use the flow control means and the energy conversion unit are configured to operate sequentially such that a flow of working fluid exits the flow passage via the flow control means, and a flow of working fluid enters the flow passage via the energy conversion unit.

In certain embodiments, the housing is arranged to contain an oscillating water column located adjacent the sea, and the direction of the working fluid acting on the energy conversion unit is associated with the fall of a passing wave.

In certain embodiments, the energy conversion unit includes a turbine rotor.

In certain embodiments, the apparatus of the fifth aspect is otherwise as defined in the first aspect.

In a sixth aspect, embodiments are disclosed of a method of extracting energy from an oscillating working fluid, the method including the steps of:
 (i) positioning a housing at least partially in a body of water having waves, the housing defining a flow passage for receiving the oscillating working fluid;
 (ii) arranging an energy conversion unit to be in fluid communication with the oscillating working fluid; and
 (iii) providing flow control means for selectively changing the configuration of the flow passage between an active configuration such that the working fluid acts on the energy conversion unit when flowing in a first predetermined direction, and a bypass configuration in which the working fluid bypasses the energy conversion unit when flowing in a second direction.

In certain embodiments, the method of the sixth aspect is otherwise as defined in the third aspect.

In a seventh aspect, embodiments are disclosed of a method for locating an oscillating wave column energy capture device at an offshore location in a body of water, the method including the steps of:
 (i) locating the device on an operably submersible floating platform, the device itself fitted with flotation aids;
 (ii) causing the said platform and the device to become floated on the body of water;
 (iii) moving said platform and device to a pre-determined location in the body of water;
 (iv) causing the platform to become submerged, and thus separated from the device, thereby leaving the device floating in the body of water by means of its flotation aids; and then
 (v) removing the flotation aids so that the device can become partially submerged and rest on the floor of the body of water at the pre-determined location for its intended operational use.

In certain embodiments, the energy capture device is otherwise as defined in the first or fifth aspects.

In this Summary and throughout the specification, the abbreviation MSL is used for "mean surface level" or "mean sea level", and is defined as the mid-point between a mean low and a mean high tide in a body of water at a particular location. MSL therefore means an average level of the surface of a particular body of water, and thus also represents a vertical depth datum point from which variations in wave crests or troughs can be measured.

Aspects, features, and advantages of this disclosure will become apparent from the following detailed description when taken in conjunction with the accompanying drawings, which are a part of this disclosure and which illustrate, by way of example, principles of any inventions disclosed.

DESCRIPTION OF THE FIGURES

The accompanying drawings facilitate an understanding of the various embodiments which will be described:

FIG. 2 is a rear, perspective schematic view of the apparatus according to FIG. 1;

FIG. 3B is a schematic, partial cross-sectional, side elevational view of the apparatus according to FIG. 1, when viewed along a sectional plane A-A which is orthogonal to the MSL, and at the moment a wave moves through the apparatus, and gas is displaced and flows out of the fluid control device(s);

FIG. 3C is a schematic, partial cross-sectional, side elevational view of the apparatus according to FIG. 1, when viewed along a sectional plane A-A which is orthogonal to the MSL, and at the moment a wave moves back out the apparatus toward the body of water, the fluid control device(s) are closed, and gas is drawn in a flow through a unidirectional turbine, to turn the turbine and to generate electrical energy;

DETAILED DESCRIPTION

This disclosure relates to the features of an apparatus for extracting energy from an oscillating working fluid, for example ocean waves repeatedly entering and leaving the apparatus in use. The disclosure also relates to the features of the apparatus which maximise the capture of the incoming waves. The disclosure also relates to a method of operating and controlling the apparatus to maximise the quantity of energy generated. The apparatus has a design which enables greater energy generation per unit flow of fluid than known techniques in this field.

Figure 1:
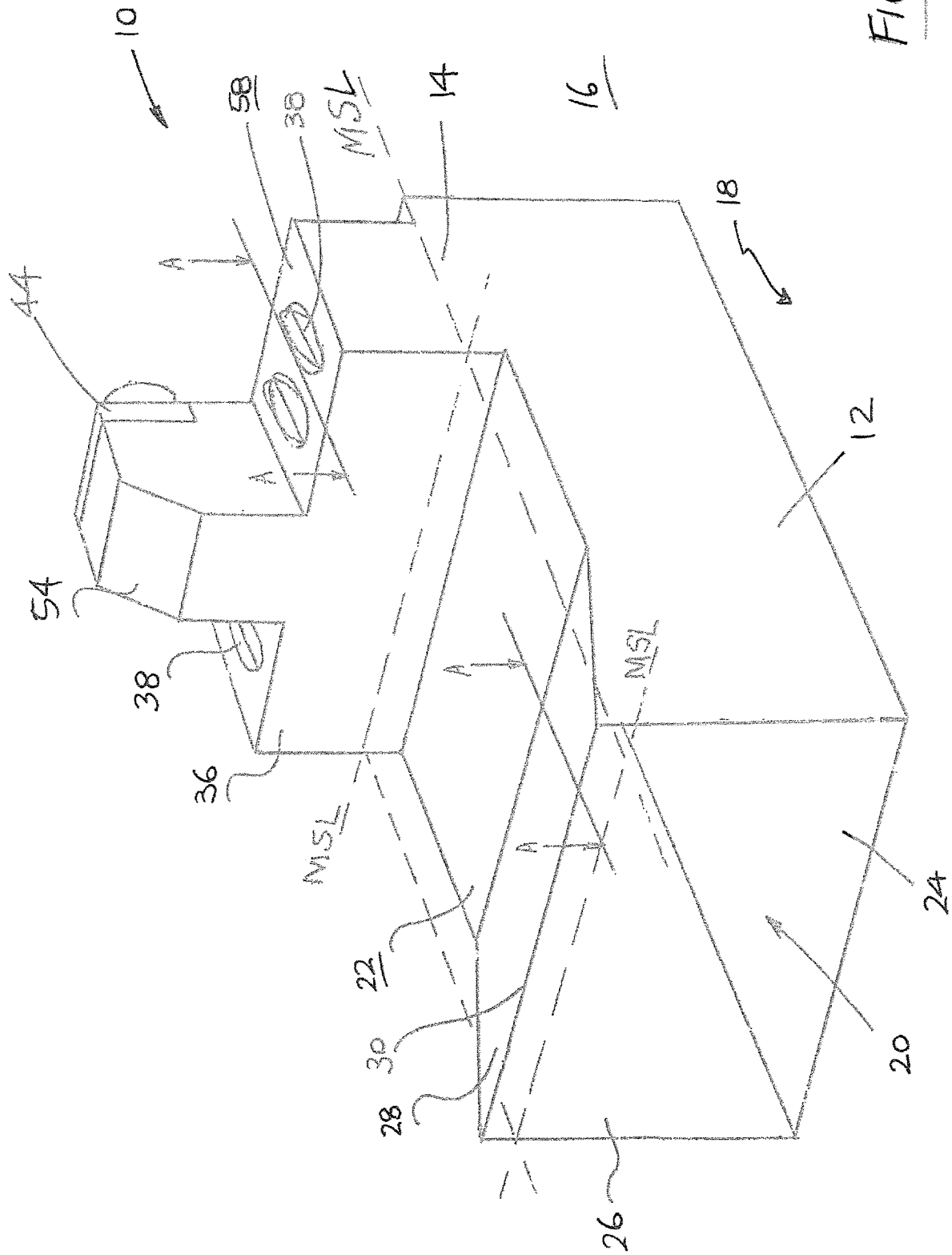
FIG. 1 is a front, perspective, schematic view of an apparatus for extracting energy from an oscillating fluid, such as a wave from a body of water, in accordance with a first embodiment of the present disclosure.

Referring to the drawings, the apparatus shown in FIGS. 1 and 2 comprises a duct 10 having two arm portions 12, 14, each arm comprising an elongate conduit which is generally rectangular in cross-section and arranged orthogonally to one another and connected in a generally L-shaped configuration, when the duct 10 is viewed from the side. (In further embodiments, like parts are given like part numerals for ease of reference in this description).

The first conduit 12 of the duct 10 is arranged in use to be substantially submerged below the mean surface level (MSL) of a body of water 16 in which it is located, for example to rest on the sand and rock base 18 at an ocean shoreline, and oriented with its elongate axis oriented generally horizontally to be aligned with the sand and rock base 18.

The first conduit 12 has a rectangular-shaped opening mouth 20 which is arranged for receiving an incoming wave flowing in from the body of water, the mouth 20 being oriented outwardly into the body of water which is the source of the waves, for example an ocean or lake. As shown in FIG. 1, the cross-sectional area of the mouth 20 is greater in area than at any point in the rest of the first conduit 12, because the first conduit 12 tapers down in cross-sectional area when moving in a direction from the opening mouth 20 inwardly into the interior of the duct 10 and towards the second conduit 14. The effect of a general tapering of this solid-walled first conduit 12 is to accelerate the flow of incoming waves from the body of water 16 into the duct 10, for reasons which will become apparent when an oscillating flow is created in use.

In the embodiment shown, a part of the upper wall 22 of the first conduit 12 is sloped downwardly and is angled towards the flat base floor 24, which rests on the sand and rock base 18, in use. Vertical side walls 26 extend between the flat base floor 24 and the upper wall 22 of the first conduit. In the embodiment shown, the tapering entry region of the first conduit 12 extends for about one third of the length of the conduit 12, but this can be a different proportion in other embodiments. For example, the first conduit may comprise a sloped upper wall over its entire length, along with a flat base floor 24 and with vertical side walls 26 extending therebetween. In another embodiment, the first conduit can have an upper wall and a base floor which are both sloped inwardly towards one another over some of the length of the conduit, when moving in a direction from the opening mouth inwardly into the duct. In yet another embodiment, the side walls of the first conduit can also be angled to taper inwardly, to form a conduit with a narrowing width so that it has a cross-sectional area which reduces when moving in a direction from the opening mouth inwardly into the duct.

In the embodiment shown in the drawings, the outermost and uppermost region 28 of the mouth 20 of the first conduit 12 is arranged in use to extend above the MSL of the body of water 16 in which it is located, to form a wave-piercing lip 30 of the mouth 20. This feature can help to capture and channel a greater flow of incoming waves from the body of water 16 into the duct 10, particularly if the motion of the body of water is rough or choppy.

The second conduit 14 of the duct 10 is arranged in use to be substantially extending above the MSL of the body of water 16 in which it is located, oriented with its elongate axis being generally perpendicular to that of the first conduit 12. The second conduit 14 is elongate and extends from the first conduit 12, and is arranged for receiving water from the incoming wave after it has flowed through the first conduit 12. After an incoming wave flows through the first conduit 12 and into the second conduit 14 of the duct 10, it is then free to flow back out of the second conduit 14, via the first conduit 12, and to return to the body of water 16, thereby setting up an oscillating water flow in the duct 10 which can be arranged to match the incoming and outgoing flow of the waves at the shoreline of the body of water 16. The second conduit 14 extends to a height above a maximum level of water 32 received from the incoming wave after it flows through the first conduit 12. A volume of gas (typically air) which is located above that maximum level of water 32, can be displaced out of, and then drawn back into, the uppermost region of the second conduit 14 as will shortly be described.

To assist with an oscillating water flow, the dimensions of the interior of the duct 10 at the transition surface where the conduits 12, 14 are joined up, are the same. The first 12 and second 14 conduits also have a flow direction control segment in the form of a planar sloped portion 34 arranged at the junction of the two conduits 12, 14, which facilitates the flow of incoming water to be able to turn from a horizontal axial flow to a vertical axial flow orientation within the duct 10, and subsequently from a vertical axial flow to a horizontal axial flow orientation when the water oscillates in the reverse direction and flows outwardly from the duct 10 toward the body of water 16. If the cross-sectional area of first conduit 12 becomes narrower as the fluid progresses into the duct 10, the fluid velocity will increase, which in turn can drive the fluid column formed within the duct 10 to oscillate more quickly.

In the uppermost region 36 of the second conduit 14, and above the maximum level of water 32 as it is received from the incoming wave, is a displaceable volume of air which can exit the uppermost region 36 via a number of flow control devices in the form of butterfly or one-way check valves 38, which can be opened automatically, or arranged to swing or to move open. The uppermost region 36 inside the second conduit 14 (and above the maximum level of water 32) defines a flow passage 40, which is also in fluid communication with a unidirectional turbine 44. In the embodiments shown herein, the valves 38 and turbine 44 are in direct fluid communication with the flow passage 40, meaning that air movement into and out of the flow passage 40 does not pass through a valve before it reaches a turbine, or vice versa. In other words, these valves and turbine are not arranged in series with one another, but rather are arranged in a parallel operational configuration with one another, being positioned at discrete, spaced-apart openings in the walls of the flow passage chamber 40, inside the second conduit 14. Such an arrangement allows for selectively changing the configuration of the flow passage 40, so that the working fluid (such as air) can act unidirectionally on a turbine, or instead be operated in a bypass configuration (that is, bypassing the turbine) to flow unidirectionally via the discharge valves. At an uppermost end of the flow passage 40, these valves and the turbine are above the reach of the water level of the sea, lake or other body of water, as will be described.

Figure 3A:
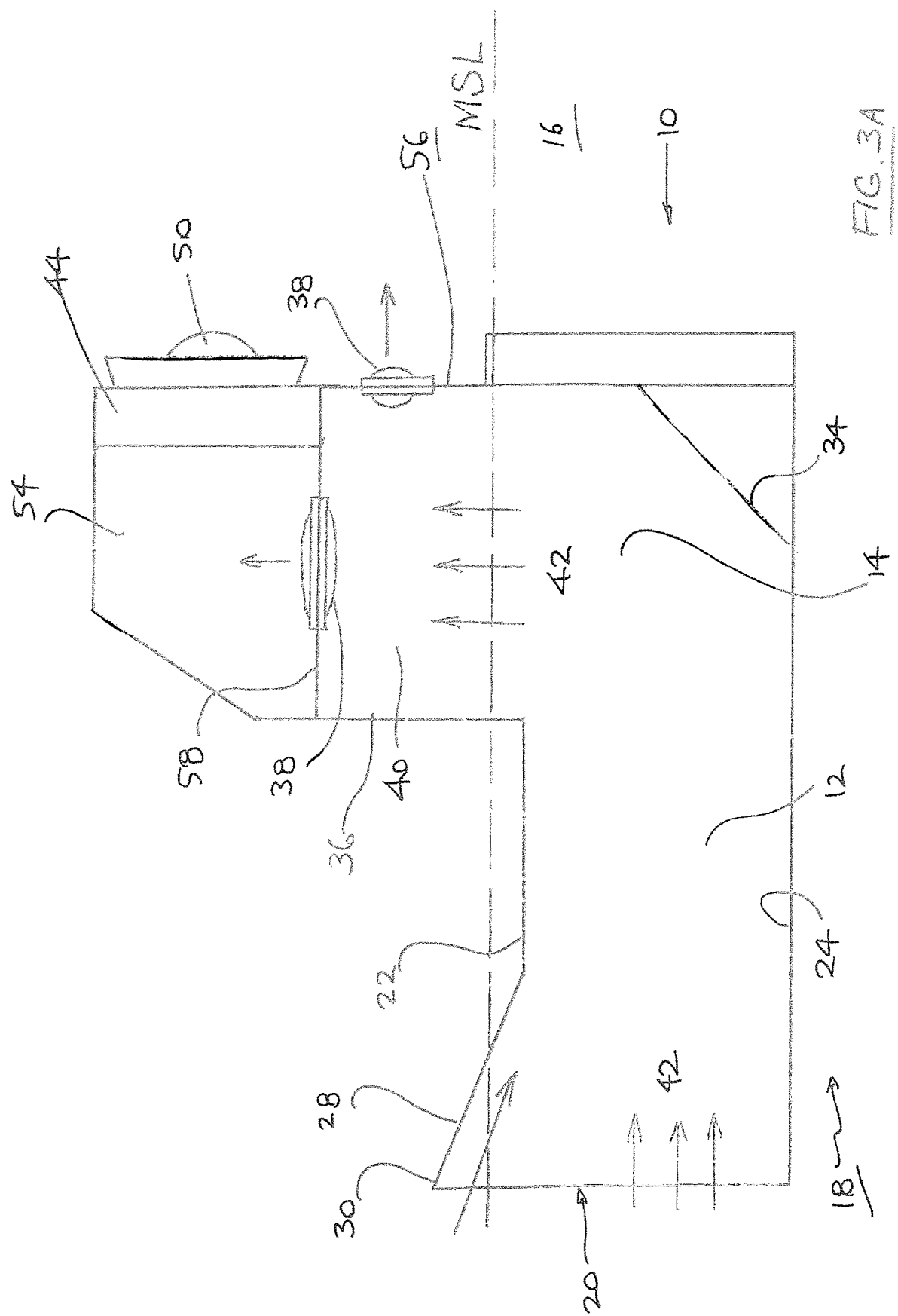
FIG. 3A is a schematic, partial cross-sectional, side elevational view of the apparatus according to FIG. 1, when viewed along a sectional plane A-A which is orthogonal to the MSL, and at the moment of inception of a wave moving toward the apparatus.

Referring now to FIG. 3A, the moment of inception of a wave moving toward the duct 10 is shown, with the wave piercing 30 lip and the narrowing cross-sectional area of the first conduit 12 serving to guide the incoming wave into the duct 10. In FIG. 3B, the wave moves through the duct 10 in the direction of the arrows 42, and some of the air in the flow passage 40 in the uppermost region 36 is displaced by the vertically rising water in the duct 10, and flows out of the butterfly or one-way check valves 38 and is discharged to the atmosphere. The valves 38 are arranged to have a lightly feathered movement, so that the flow of air out of the flow passage 40 is sufficient to open them, and to offer a path of least resistance out of the duct 10, rather than for any significant quantity of air to leave the flow passage via a unidirectional turbine 44.

In FIG. 3C, the wave then moves back out of the duct 10 via the mouth 20 and towards the body of water 16 in the direction of the arrows 46, which is in a direction opposite to the direction 42 of the incoming wave as depicted in FIG. 3B. As a result of the flow in the outward direction 46, atmospheric air is drawn into the flow passage 40 in the uppermost region 36 by a suction created by the departing water. Because the butterfly or one-way check valves 38 are now fully closed, the air can only be drawn in through the unidirectional turbine 44, and this flow of air this causes the turbine 44 to turn so as to generate electrical energy.

In some other embodiments, when atmospheric air is drawn into the flow passage 40 in the uppermost region 36 by a suction created by the departing water, the valves can be of a type, or arranged at a position of partial closure, which restricts air flow therethrough, rather than being completely closed to such air flow. However, the majority of the air being drawn into the flow passage 40 is via the unidirectional turbine 44. Thus, the flow of air both into and out of the flow passage 40 is therefore responsive to, and generated by, oscillations of an oscillating water column in the duct 10, which is set up by the repeated wave flow frequency in the particular location.

In yet other arrangements disclosed herein, the flow situations shown in FIGS. 3B and 3C may be reversed, so that when the wave moves into the duct 10, the air in the flow passage 40 in the uppermost region 38 is displaced by the rising water in the duct 10 to flow out of the unidirectional turbine 44 so as to be discharged to the atmosphere. In such an arrangement, when the wave moves out of the duct 10 via the mouth 20 and towards the body of water 16, atmospheric air is then drawn back into the flow passage 40 via the valves 38, which are arranged to be more easily opened in one direction into the flow passage 40 than the air flow which can be achieved into the flow passage 40 through a unidirectional turbine 44. However, the work of the inventor has established that the efficiency of such an arrangement is significantly less than able to be achieved by the flow situations shown in FIGS. 3B and 3C. It is during the downstroke of air suction into the flow passage 40 (that is the falling, or drawing out, of a wave from the oscillating water chamber) which provides the maximum power generation feature, and the energy produced by the rotation of the turbine 44 in this configuration is significantly more than is achievable using either (i) bidirectional turbines, or (ii) using the pressure of an upstroke of air pressure into the duct and toward a turbine, such as from an incoming ocean wave (the latter is the weakest in terms of energy).

Figure 4:
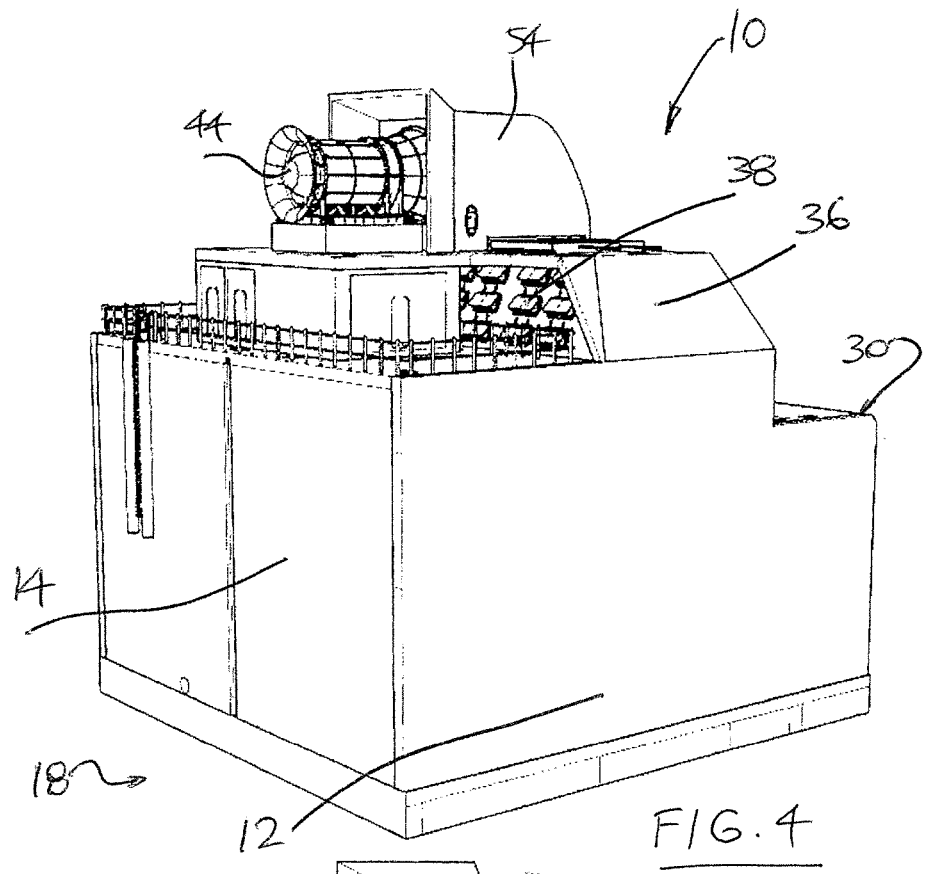
FIG. 4 is a front, perspective, schematic view of an apparatus for extracting energy from an oscillating fluid, such as a wave from a body of water, in accordance with a further embodiment of the present disclosure.
Figure 5:
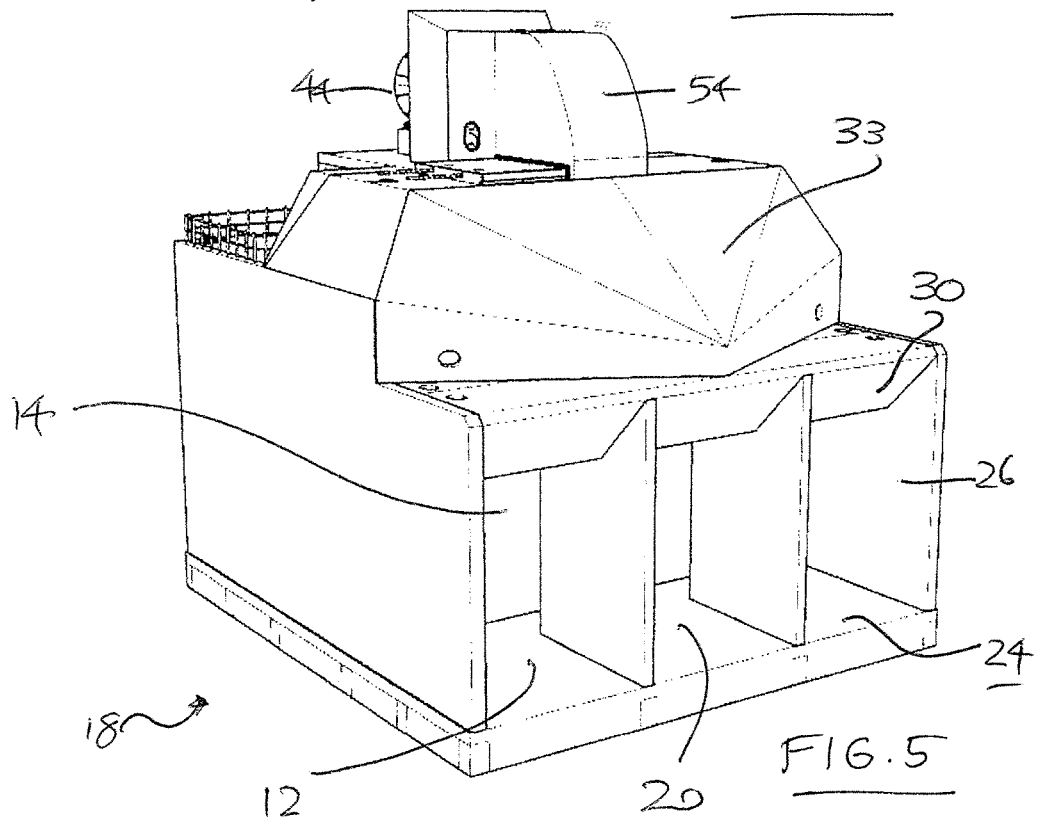
FIG. 5 is a rear, perspective schematic view of the apparatus according to FIG. 4, depicting the lowermost inlet region to the interior of the oscillating wave column, and the wave-piercing lip.
Figure 6:
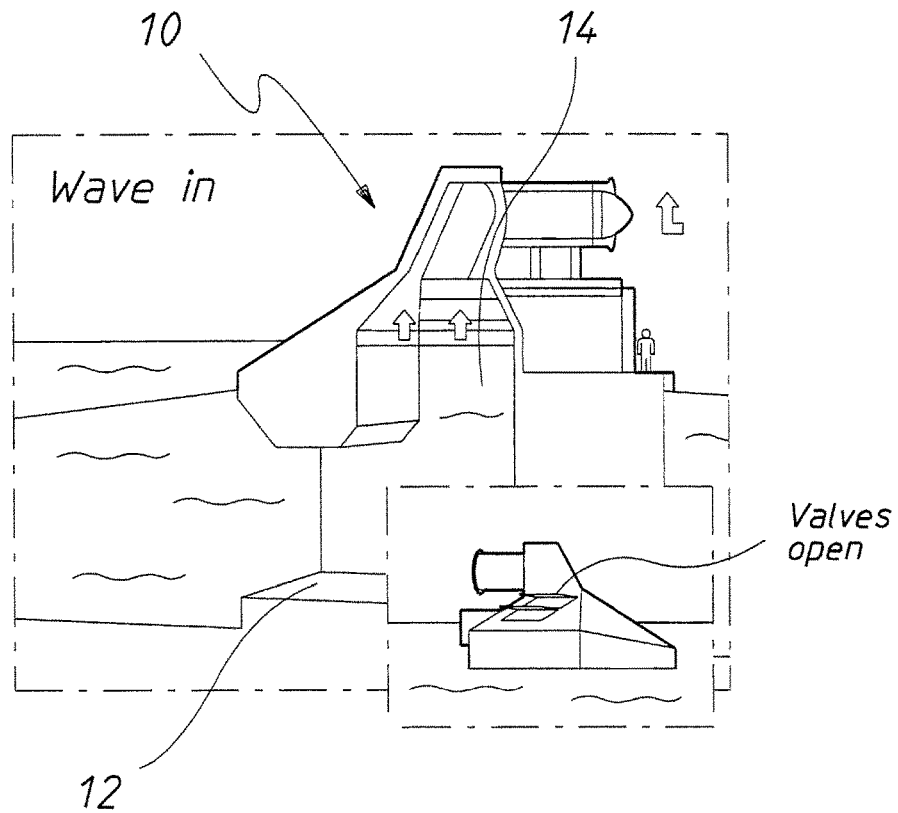
FIG. 6 is a schematic, partial cross-sectional, side elevational view of an apparatus for extracting energy from an oscillating fluid, such as a wave from a body of water, in accordance with a further embodiment of the present disclosure; the drawing depicts the moment a wave moves through the apparatus, and gas is displaced and flows out of the fluid control device(s) (inset photo, valves open)
Figure 7:
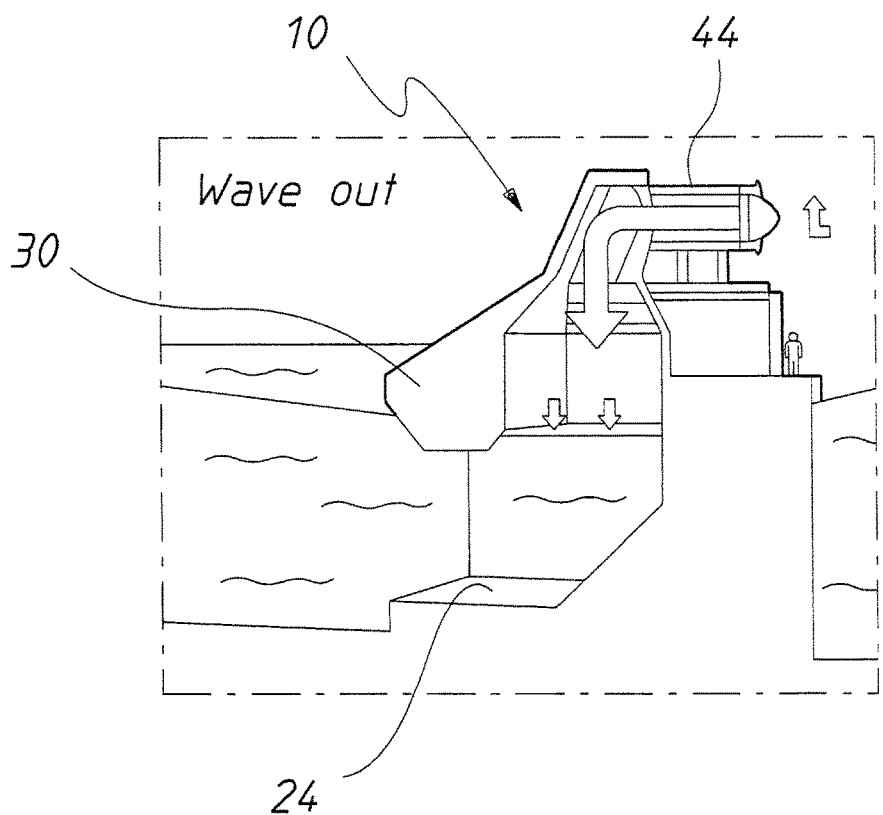
FIG. 7 is a schematic, partial cross-sectional, side elevational view of the apparatus according to FIG. 6; the drawing depicts the moment a wave moves back out the apparatus toward the body of water, the fluid control device(s) are closed, and gas is drawn in a flow through a unidirectional turbine, to turn the turbine and to generate electrical energy.
Figure 8:
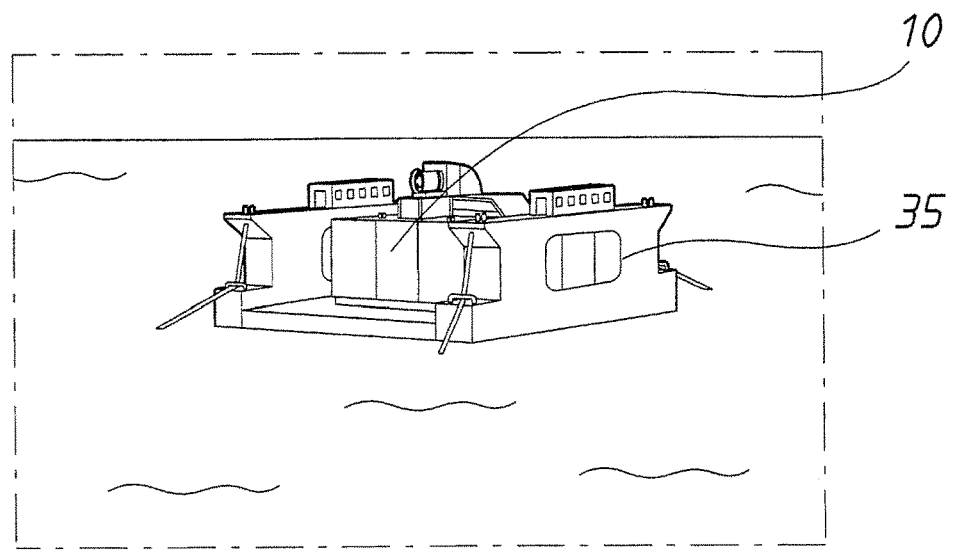
FIG. 8 is a front, perspective, schematic view of an apparatus for extracting energy from an oscillating fluid, such as a wave from a body of water, in accordance with a further embodiment of the present disclosure; said wave energy collection apparatus being shown positioned on a floating dock which is submersible. In a non-submerged state the dock is able to be moved by towing behind a shipping vessel for in-water location of the apparatus. The oscillating wave column device is itself fitted with flotation aids.
Figure 9:
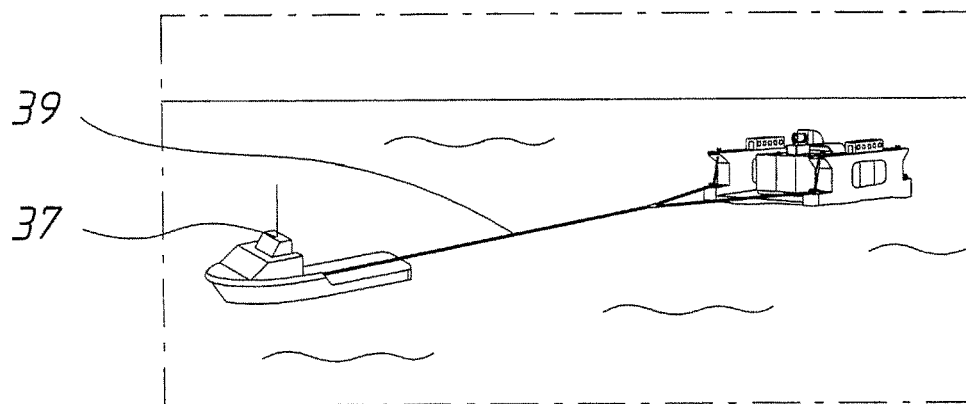
FIG. 9 is a front, perspective, schematic view of the apparatus for extracting energy in accordance with FIG. 8, said apparatus being positioned on the said submersible floating dock which is depicted in the non-submerged position, and now the apparatus and the dock are shown being towed behind a shipping vessel in the form of a tugboat, in a direction toward the pre-determined destination of the apparatus on the body of water.
Figure 10:
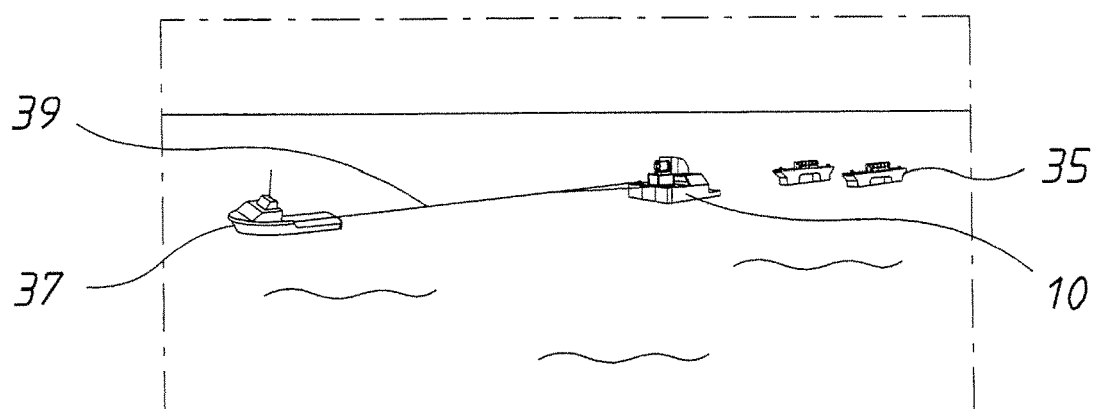
FIG. 10 is a front, perspective, schematic view of the apparatus for extracting energy in accordance with FIG. 8, said apparatus now shown separated from the submersible floating dock. The dock is depicted as having been lowered in the water so that the apparatus (floated by means of its flotation aids in the form of buoy panels) can then be dragged forward and separated from the dock.
Figure 11:
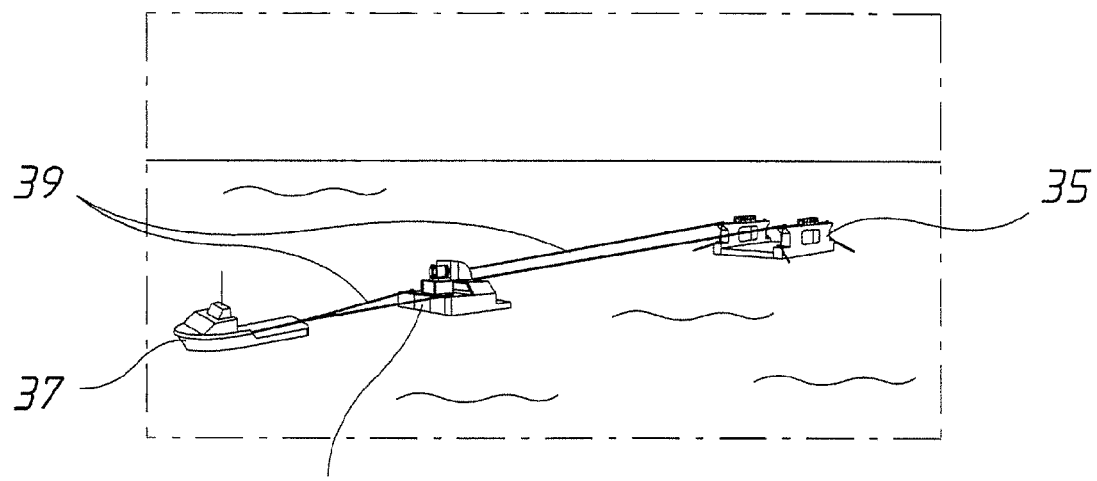
FIG. 11 is a front, perspective, schematic view of the apparatus for extracting energy in accordance with FIG. 8, said apparatus now shown separated from the submersible floating dock, and the dock has now been raised up in the water again, and is floating. The tugboat tows the wave energy collection unit forward, and away from the dock.
Figure 12:
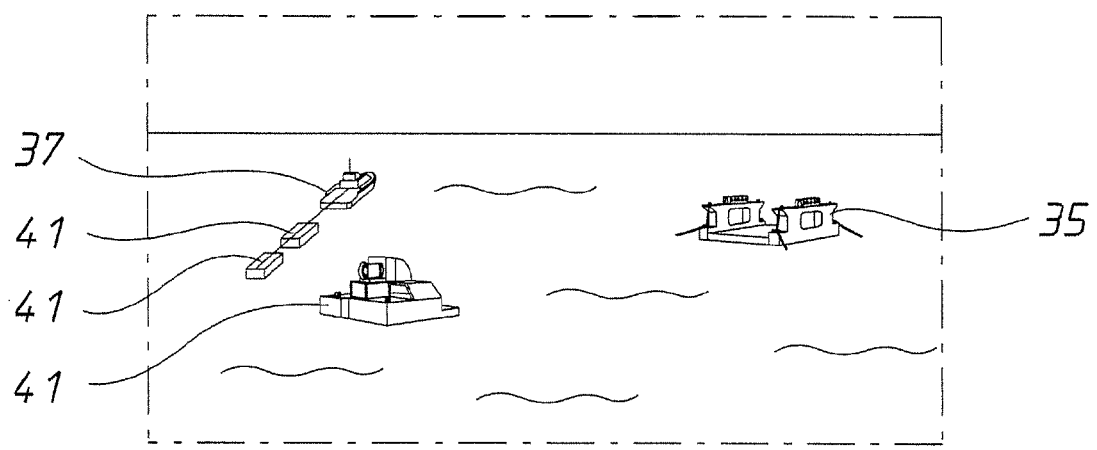
FIG. 12 is a front, perspective, schematic view of the apparatus for extracting energy in accordance with FIG. 8, said apparatus now shown as being partially submerged by means of removal of some of the buoy panel elements (flotation aids) from its outer side walls. This is because the apparatus has now been moved to its pre-determined end use location in the body of water. The unit settles into its position on the shoreline sea floor.
Figure 13:
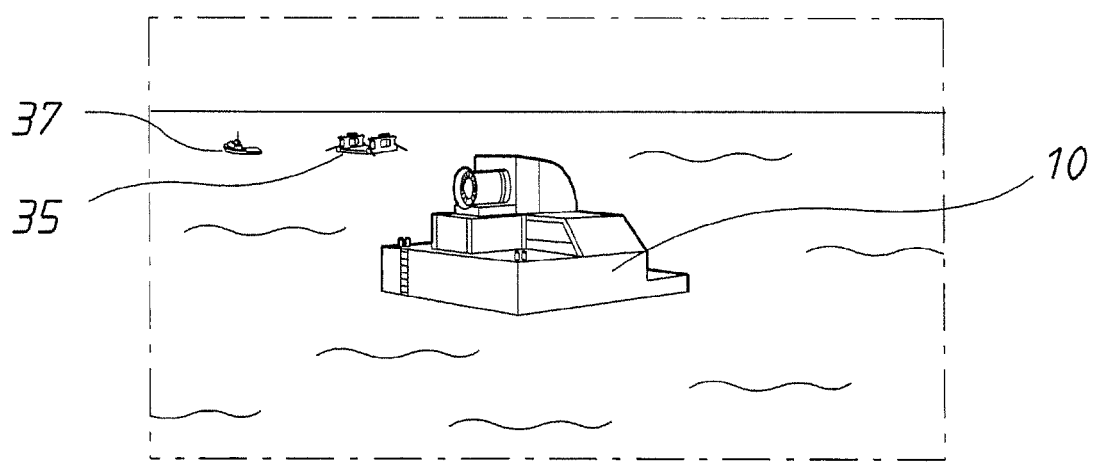
FIG. 13 is a front, perspective, schematic view of the apparatus for extracting energy in accordance with FIG. 8, said apparatus now shown as partially submerged in its final position in the water, resting on the sea floor, where it will capture waves and generate energy. All buoy panel elements (flotation aids) have been removed from its sides. The floating dock, and the buoy panels are all shown being removed by the tugboat, for repeated use.

Referring to the embodiment shown in FIGS. 4 and 5, a duct 10 of a somewhat different appearance is shown. In all respects it is functionally similar to the previously described embodiment. Each arm portion 12, 14, comprises an elongate conduit which is generally rectangular in cross-section and these portions are arranged orthogonally to one another and connected in a generally L-shaped configuration.

The first conduit 12 of the duct 10 is arranged in use to be substantially submerged below the mean surface level (MSL) of a body of water, and oriented with its elongate axis oriented generally horizontally to be aligned with the sand and rock base 18. In the uppermost region 36 of the second conduit 14 are a number of flow control devices in the form of butterfly or one-way check valves 38, which can be opened automatically, or arranged to swing or to move open. The uppermost region 36 inside the second conduit 14 (and above the maximum level of water 32) defines a flow passage 40, which is also in fluid communication with a unidirectional turbine 44.

Geometrical design features adopted by the inventor include the introduction of the sloped front lip and pointed bow 33, shown in FIG. 5, to reduce wave loads on the front face of the duct 10.

Figure 14:
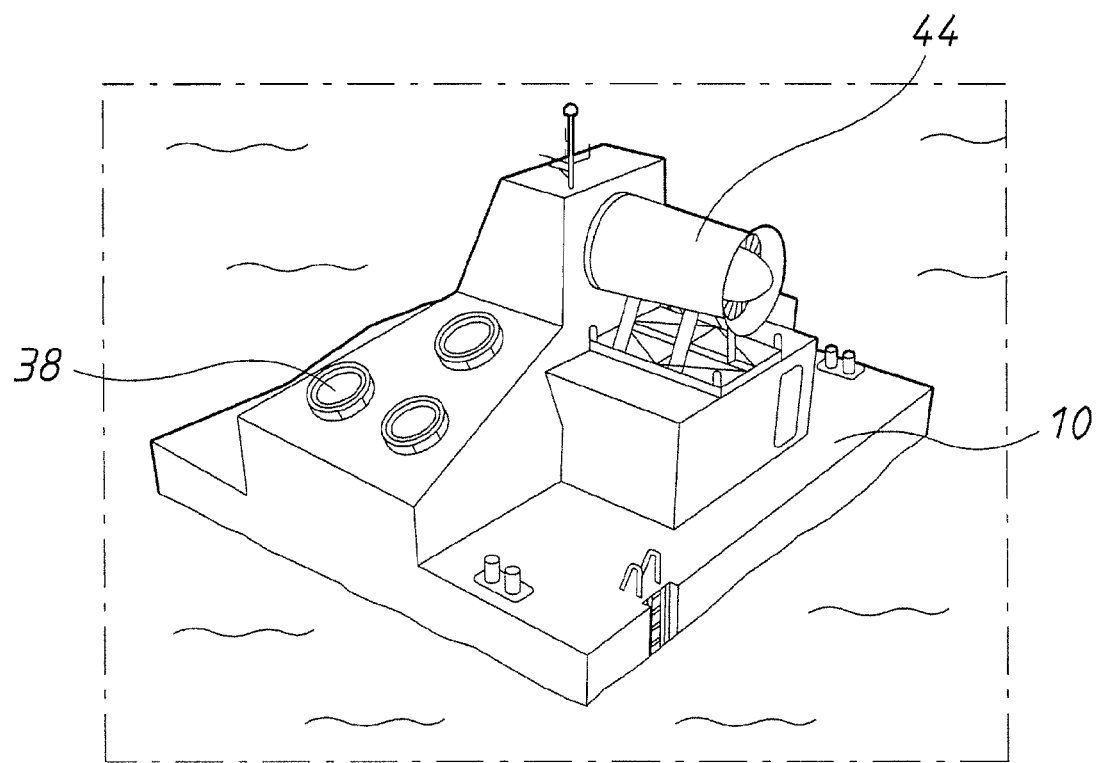
FIG. 14 is a front, top, perspective, schematic view of an apparatus for extracting energy from an oscillating fluid, such as a wave from a body of water, in accordance with a further embodiment of the present disclosure; the apparatus is shown positioned in a body of surrounding water.
Figure 15:
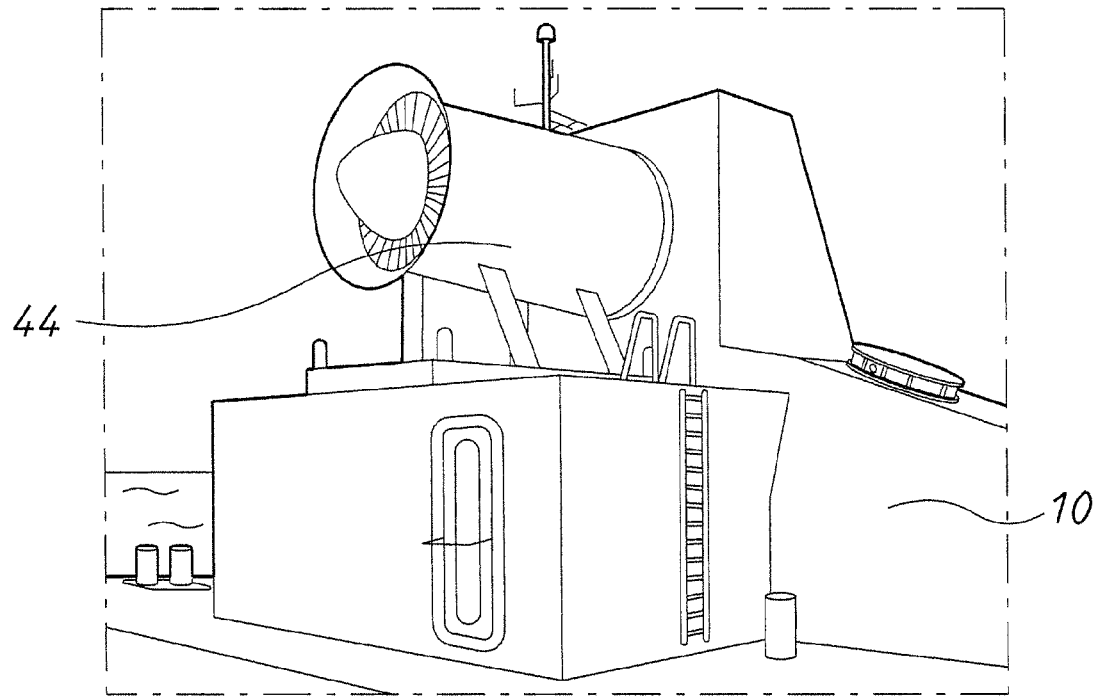
FIG. 15 is a front, perspective, schematic view of an apparatus of FIG. 14; the apparatus is shown positioned in a body of surrounding water; this shows more detail of the turbine atop the apparatus.

Referring to the embodiment shown in FIGS. 14 and 15, a duct 10 of a somewhat different appearance is shown. In all respects it is functionally similar to the previously described embodiment. Like part numbers are used to illustrate functionality.

In yet other embodiments, the valves 38 are fitted with a control mechanism to control their opened and closed configurations. For example, the valve may have a gate which can be opened and closed to the flow of gas by a hinged movement, or by a sliding movement or by a rotatable movement to at least cover a part of the cross-sectional opening passage of the valve. In yet other embodiments, the valves used can be configured in any other appropriate orientation to respond to changes in the pressure and/or direction of flow of the oscillating air entering and leaving the flow passage 40.

Importantly, because the access to the displaceable gas in the flow passage 40 in the uppermost region 36 of the second conduit 14 can be via one or more valves 38 (or other forms of flow control devices) as well as via the unidirectional turbine 44, it is possible for the system to be configured to operate each form of access to the flow chamber separately, and sequentially, to the other. By doing so, this means that the design of the turbine 44 can be considerably simpler than the arrangements in prior art oscillating water columns for power generation, many of which have focused on the development of new turbine designs which can cope with a bi-directional air flow using a turbine which rotates unidirectionally on a shaft. In such prior art equipment, the gas in the flow passage in the uppermost region of the second conduit is displaced by the vertically rising water in the duct, and flows out of a unidirectional turbine and becomes discharged to the atmosphere, but when gas is drawn back into the flow passage by suction, it needs to flow via the same unidirectional turbine but in the opposite direction, which necessitates an adjustable flow turbine design of great complexity.

In the present system, the turbine 44 is of a basic known design, and includes a rotor 48 comprising a central hub 50 located on one end of a rotatable shaft, and a plurality of blades 52 arranged about and extending from the periphery of the hub 50, the rotor 48 being disposed within a housing 54 in fluid connection with the flow passage 40. The shape of the turbine blades 52 and their orientation in relation to the hub 50 facilitates unidirectional rotation of the turbine rotor 48 in response to a unidirectional axial flow of gas through the turbine housing 54.

As is typical in turbines of this type, an electric generator is configured for rotation by the turbine to generate electrical energy, and is connected to the end of a drive shaft of the turbine 44, at the other end of the drive shaft to the location of the hub 50.

The system described has other significant operation advantages over the known prior art because of the ability to adjust the orientation of the valves 38 to respond to changes in the pressure and/or direction of flow of the oscillating air. For example, it is possible to "tune" the frequency of the oscillating water column in the duct 10 to match the frequency of movement of an incoming and outgoing wave from the ocean by opening or closing a number of the valves 38 located at the second conduit 14 in the portion which extends above the MSL. By doing this, the air pressure resistance in the flow passage 40 in the uppermost region 36 of the second conduit 14 which faces against the rising water in the duct 10, can be adjusted. If the frequency of the oscillating water column which flows into and out of the duct 10 substantially corresponds to the frequency of the incoming and outgoing waves from the body of water 16, then the operation of the energy extraction apparatus will be smoother and more efficient, rather than needing to operating in a situation where the oscillating flows in the duct 10 are constantly out of sequence with the waves, and therefore subjected to extra turbulence and inefficient draw of air into the turbine 44.

Such a "tuning" of the frequency of the oscillating water flow in the duct can be performed continuously, depending on the prevailing ocean wave conditions, for example by automating the adjustment of the valve openings by using a control mechanism which is responsive to measured changes in the pressure of incoming and outgoing waves. In such an arrangement, the control mechanism can selectively open or close (or partially open or close) one or more of the valves 38. This adjustment can change the available cross-sectional area of openings to and from the flow passage 40 in the uppermost region 36 of the second conduit 14 of the duct 10, as a proportion of the total surface area of that second conduit 14 which lies above the MSL, such a proportion now defined by the inventor as an "optimum venting ratio". In one example, the optimum venting ratio is less than 15%, but an optimum venting ratio of less than 10% can also be suitable. Depending on the average wave height and period of the waves, (the sea state may be very calm or very rough), a lower or higher optimum venting ratio may be required, for example as low as 1%, in order to optimise the time that the oscillating water flow spends in the duct 10.

In yet a further example of "tuning" of the frequency of the oscillating water flow in the duct, if the prevailing ocean wave conditions are dangerous or wild, for example during a storm, the valve opening control mechanism can be used to close and lock down a sufficient number of the valves 38 so that a head of air pressure is established within the flow passage 40. Such "de-tuning" can act as a safety feature by excluding the strongest waves from the ocean from reaching as far up into the duct, and in doing so, possibly protecting the valves and turbine from storm damage.

As is shown in FIG. 2, the uppermost region 36 of the second conduit 14 of the duct has four butterfly valves 38 shown on the rear, upper, vertical side wall 56 of the duct 10, and three butterfly valves 38 shown on the top horizontal wall 58 of the uppermost region 36 of the second conduit 14. In other embodiments, more or less than this number of valves 38 can be installed at the time of the initial construction of the duct, depending on the location and expected ocean wave severity that will be encountered, thereby being a design feature which changes the possible maximum venting ratio of the particular duct. In other embodiments, the type of valve can also be varied, and also combinations of different types of valves are possible to be fitted on one duct too (butterfly, one-way check valves, and so on).

Once the repeated steps of opening the valve(s) 38 as the wave enters the duct 10, followed by valve(s) 38 closing and air being drawn into the second conduit 14 via the turbine 44 as the wave leaves the duct 10, have reached a stable pattern, the turbine 44 and generator will generate electrical energy which can be conveyed from the duct 10 (if located offshore) to the land (on the shore) by means of an insulated high voltage copper cable.

As a general and non-limiting indication of size, a typical duct has a first conduit length of around 8-10 metres, and a second conduit which extends 15-18 metres above the base surface of the body or water or ocean shoreline at which it is located. The structure of the duct is typically made of reinforced concrete, so as to have the weight and strength to be able to withstand the pressure of repeatedly being struck by ocean waves, in a corrosive salty environment.

The inventor has discovered from experimental results using the new energy extraction apparatus that there is a significant increase in the energy capture from a unidirectional turbine 44 which is configured to operate with a unidirectional flow of air, rather than a unidirectional turbine which is configured to operate with a bidirectional flow of air. For an equivalent period of operation, as air is drawn through the turbine 44 and into the flow passage 40 when the wave moves out of the duct 10 towards the body of water 16, the energy generated is 16% better than could be achieved using known bidirectional turbine designs with a flow operating in that same direction. It is believed that this improved result is caused by a combination of the downward hydrostatic pressure head of the oscillating water column located in the second conduit 14, in addition to the suction draw of the body of water 16, as it draws water out of the duct 10. Therefore, because the present system can be configured to isolate the steps of both expulsion out, and suction in, of air in relation to the flow passage 40 using different devices, it is possible to capture energy solely from the gas flow which operates in response to the wave outflow from the duct, which is also the flow with the highest potential energy.

The inventor has also discovered from experimental results using the new energy extraction apparatus that there is a significant increase in the energy capture when the feature of the wave piercing lip 30 is added to the opening mouth 20 of the first conduit 12. The accelerated delivery of flow of the incoming waves into the duct 10 results in a further improvement of 20% in the energy able to be generated when compared with known oscillating duct apparatus without such a feature. It is believed that this feature brings more fluid into the duct 10, which in turn subsequently causes more air to be drawn into the flow passage 40 in the second conduit 14 via the turbine 44 as the wave leaves the duct 10. The wave piercing lip 30 of the present disclosure is arranged so that it is almost always visible above the MSL of the waves at a particular location.

To safely position a heavy and robust apparatus such as an oscillating fluid duct within the water at the edge of a body of water is fraught with difficulties. The inventor has therefore devised a way to position the apparatus using a submersible floating dock 35 (such as a dry dock). Reference should be made to the sequence of FIGS. 8 to 13.

In a non-submerged state, the dock 35 is able to be moved by towing behind a shipping vessel 37 for in-water location of the apparatus 10. The oscillating wave column device 10 is itself fitted with flotation aids 41 for use when needed for positioning at the final stage. Once the assembled oscillating fluid duct is ready for installation, it is positioned on the said submersible floating dock (or is built atop a platform thereof during the construction phase). The non-submerged floating dock and the duct can be towed behind a shipping vessel, for example a tugboat, using long cables 39, to be moved in a direction toward the pre-determined destination of the apparatus on the body of water, such as an ocean edge/surf edge region.

When near the final location, the floating dock can be submersed and the duct remains afloat in the water by its own flotation aids. These flotation aids can be in many forms, such as hollow buoy panels, inflatable gas balloons, and the like. Once the floating duct and the submerged floating dock are parted from one another, the floating duct can be towed by itself a short distance into its desired final operational position, and the flotation aids then removed, or deflated etc. The unit will then settle under gravity into its position on the shoreline sea floor, and remain partially submerged in its final position in the water, where it will capture waves and generate energy.

Using the submersible dock provides great advantages such as stability of handling such a sizeable apparatus when moving across open ocean to reach a remote coastline for final installation. The floating dock minimises the risk of capsizing or sinking of the duct apparatus in rough weather.

Experimental Section

Experimental performance results are presented for the present embodiment of an Oscillating Water Column (OWC) as a Wave Energy Converter (WEC). The operating principle for this device utilises air valves that open during times of positive pressure, thereby venting the air chamber, and shut when the air chamber pressure is negative, thus drawing air through a unidirectional air turbine Power Take-Off (PTO). Results are presented for both regular and irregular seas.

Prototype top lip and front wall geometry are design features which appear to positively affect the operational characteristics of the device. Experimental results indicate this unidirectional prototype will exhibit very good energy harvesting capability over a wide range of wave frequencies.

The OWC is a large hollow concrete chamber, partially submerged and sitting on the seabed and vented to the ocean through an underwater opening. The chamber also includes a small opening to the atmosphere above the water line, in which is housed an air turbine.

As wave crests and troughs pass a conventional OWC, water enters and leaves the chamber through its submerged opening. This water rises and falls inside the chamber, causing the pressure of the air trapped above to oscillate between positive and negative pressure. In some past embodiments, these pressure fluctuations forced the air to pass through a bi-directional turbine at the top of the chamber, in an attempt to stably generate electricity as it does so.

The fundamental conceptual difference between the OWC of the present disclosure and with conventional OWCs is that the turbine is only exposed to air flow from one direction. Passive air flow valves allow air to escape the chamber but not return. This results in simpler turbine design constraint which means the turbine can be optimised for unidirectional air flow. Also, the turbine exhibits low frictional losses.

Figure 17:
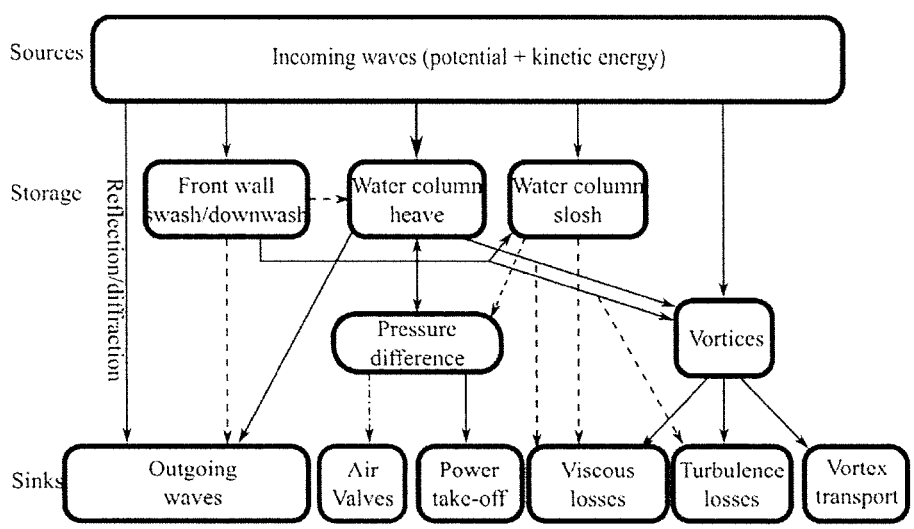
FIG. 17 is a graphical depiction of the energy balance found for a vented oscillating water column device, which is the type of apparatus of the present disclosure.

Even though air is directed through the air turbine for only half the wave cycle, almost all the energy from the entire wave cycle (subtracting conventional turbulent and frictional losses) is available for extraction. This process is explained in further detail by means of an Energy Balance, as depicted in FIG. 17.

A. Unidirectional Air Turbine Power Take-Off

Figure 16:
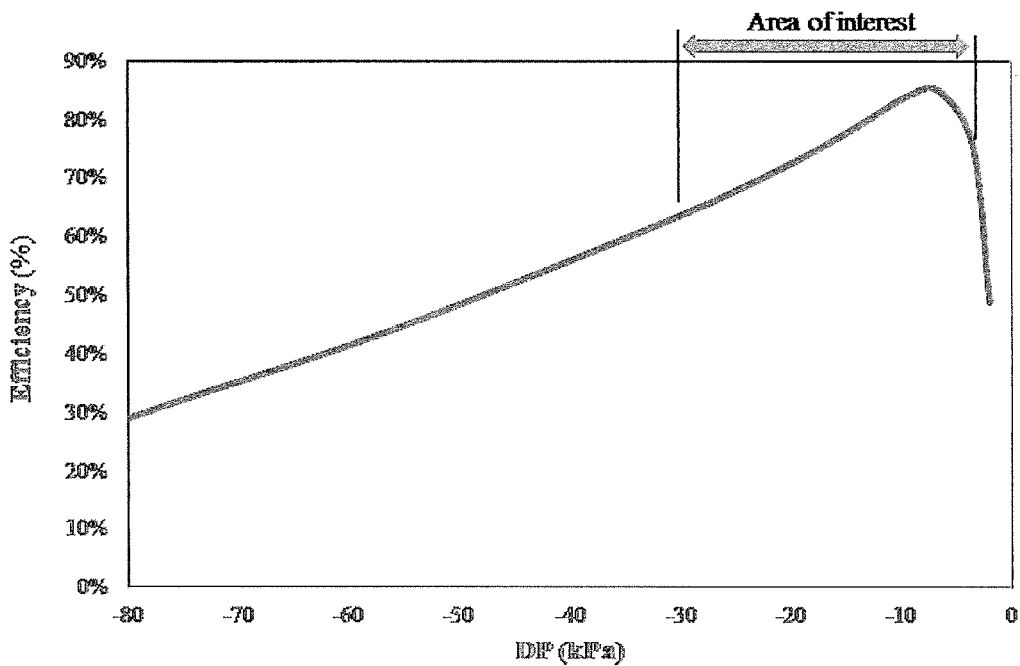
FIG. 16 is a graph showing a predicted efficiency curve for the large scale prototype unidirectional air turbine being developed, based on the apparatus of the present disclosure.

A conventional stator plus rotor type turbine design was developed by the inventor for extracting power from the air flow induced by the pneumatic pressure of the OWC. The single stage turbine operates on unidirectional air inflow over a wide range of pressure drop conditions. The predicted turbine efficiency against turbine differential air pressure ($\Delta p$) is presented in FIG. 16 which was generated with the Aoleus meanline turbine performance analysis. The weighted average turbine efficiency over the range of typical operation, down to −30-kPa (measured as the product of torque multiplied by angular velocity, divided by pressure drop multiplied by volume flow rate), is 77% based on a constant turbine rotational speed of 650 RPM.

B. WSE OWC Geometry

Geometrical design features adopted by the inventor include the introduction of the sloped front lip and pointed bow, which is shown most clearly in FIG. 5. These geometric enhancements were included with the view to improving the hydraulic performance and reducing wave loads on the OWC front face.

C. King Island Prototype

King Island is situated in the western waters of Bass Strait, approximately equidistant between Tasmania and the Australian mainland. The island, with a population of approximately 1700, is powered by its own grid system, consisting of wind turbines, some solar, battery storage, and complemented by diesel power generation.

The pilot plant project on King Island is located at a mean sea level depth of 10 metres, approximately 700 m from shore. The new design of OWC device for this project will be 20 metres wide, with a nominal peak electrical generating capacity of 1 MW. The wave climate for this location is greater than 45 kW/m, which rates it as one of the best in the world in terms of wave energy resource. Bathymetric surveys and sub-bottom profiling of the proposed site, which is located close to a suitable grid connection, has been completed.

Experimental Setup

Experiments were performed in the Australian Maritime College's Model Test Basin (MTB) which is 35 m long, 12 m wide and capable of 1 m depth but filled to a depth of 333 mm, equivalent to m depth at prototype full scale. The MTB is fitted with 16 piston type wavemaker paddles at one end and a passive beach at the other. The model was situated at the centre of the MTB 12 m from the wave maker.

The 1:30 scale model was manufactured from plywood with clear acrylic sides to enable visual observation of the internal chamber water level. 3D printed passive check valve bodies are fitted in the back and side of the model, and an acetate sheet is lightly hinged to the top edge of the body permitting the valve to open with minimal positive chamber air pressure. The Power Take-off (PTO) was simulated using an orifice plate which exhibits a non-linear pressure/flow relationship similar to that of the single stage turbine.

Air chamber differential pressure was monitored with three separate pressure transducers (1 psi Honeywell TSC sensor conditioned by an Ocean Controls instrument amplifier KTA 284), one on each side of the chamber roof and one in the side of the top clear box. Each pressure sensor was found to produce near identical values (see FIG. 18 for example). Chamber water surface elevation was monitored by six resistive wave probes. Wave probes were connected to the data acquisition system through a HR Wallingford wave probe signal conditioning box.

Data was acquired at a rate of 200 Hz using a 16 bit National Instruments PCI card (NI PCI-6254) connected to a BNC terminal box. Data recording was trigger by wave paddle motion and was recorded for a duration of 30 seconds for regular waves and 600 seconds (30 minutes full scale equivalent) for irregular waves.

Methodology

A. Sea States

Both regular and irregular waves were investigated in this analysis. Full scale equivalent irregular waves (JONSWAP) are summarised in Table I. Irregular wave conditions tested were selected based on those expected to occur at the King Island test site. Regular waves tested were chosen to cover the wave heights and frequencies of the irregular waves. Wave calibration tests were performed without the WEC model in the basin.

TABLE 1

Full scale Irregular Waves Tested in MTB Irregular Wave Hs & Tp

| | | | |
|---|---|---|---|
| 0.6 m 6.5 s | 1.4 m 19.1 s | 2.2 m 17.2 s | 3.1 m 14.8 s |
| 0.6 m 8.8 s | 1.4 m 17.2 s | 2.2 m 19.0 s | 3.1 m 19.0 s |
| 0.6 m 10.7 s | 1.5 m 6.5 s | 2.4 m 6.5 s | 3.3 m 6.5 s |
| 0.6 m 12.4 s | 1.5 m 9.0 s | 2.6 m 10.8 s | 3.4 m 9.2 s |
| 0.6 m 15.0 s | 1.8 m 10.8 s | 2.7 m 19.0 s | 3.4 m 12.6 s |
| 0.6 m 17.1 s | 1.8 m 14.9 s | 2.7 m 14.8 s | 3.4 m 17.5 s |
| 0.6 m 18.9 s | 1.8 m 19.0 s | 3.0 m 6.5 s | 3.5 m 10.3 s |
| 1.4 m 9.0 s | 2.1 m 12.6 s | 3.0 m 9.2 s | 3.6 m 12.7 s |
| 1.4 m 10.8 s | 2.2 m 9.2 s | 3.0 m 12.6 s | 3.6 m 17.5 s |
| 1.4 m 12.4 s | 2.2 m 10.8 s | 3.0 m 17.3 s | 3.8 m 10.3 s |
| 1.4 m 14.9 s | 2.2 m 14.8 s | 3.1 m 10.8 s | 4.1 m 12.6 s |

B. Pneumatic Power

Pneumatic power is calculated as $$P = \Delta p Q \qquad (1)$$

where $\Delta p$ is air chamber differential pressure and Q is the air volumetric flow rate.

Due to the model scale selected (1:30) air compressibility is considered negligible. Air in-flow rate is calculated from air chamber differential pressure using:

$$Q = C_d A_o \sqrt{|\Delta p|/\rho_a} \qquad (2)$$

where $C_d = 0.6$ is the orifice discharge coefficient, $A_o = 0.00111$ m² is the restriction orifice cross-sectional area and $\rho_a = 1.4$ kgm⁻³ is air density. An in-situ calibration determined the coefficient to be $C_d = 0.691$ for air inflow meaning that $C_d = 0.6$ is a reasonable and conservative for flow estimation. Since the chamber was fitted with air valves; air outflow does not contribute to power production, and furthermore, it is not possible to reliably predict air outflow using air pressure differential since $A_G$ becomes a variable.

C. Incident Wave Power

Regular wave power is calculated with linear theory utilising intermediate water depth calculations according to $$P_R = \overline{E} C_g \text{ (per wave crest length)} \qquad (3)$$

$$\overline{E} = \frac{\rho g h^2}{R}$$

where $\overline{E}$ is energy density (energy per unit surface area), $C_g$ is wave group celerity solved for the intermediate water depth, $\rho_w = 1000$ kgm⁻³ is water density, g=9:81 ms⁻² is gravitational acceleration, h is wave height measured crest to trough. Average irregular wave power is $$P_I = \frac{\rho_w g^2 h_{m_0}^2 T_e}{64\pi} \text{ (per wave crest length)} \quad (4)$$

where $h_{m_o} 4\sqrt{m_o}$ with $\sqrt{m_o}$ being the first spectral moment (equal to one standard deviation of the wave record), and $T_e$ is the energy period ($m_{-1}/m_o$) (derived from spectral analysis).

D. Pneumatic Efficiency

Pneumatic efficiency is defined as the ratio of the pneumatic power extracted divided by the equivalent wave power across the width of the device $$\eta_p = \frac{P}{W \cdot P_{wave}} \quad (5)$$

where w is device width facing the wave front.

E. Scaling of Results

Results were scaled to full scale using simplified Froude Similitude scaling as per Table II ($\lambda$=30), differences in water density are ignored.

TABLE II

| Froude scaling | |
|---|---|
| Unit | Factor |
| Length | $\lambda$ |
| Pressure | $\lambda$ |
| Power | $\lambda^{7/2}$ |
| Time | $\lambda^{1/2}$ |

F. Energy Balance

An energy balance is a visual representation of the flow of energy from sources, into temporary stores and finally into sinks. FIG. 17 shows an energy balance for an OWC with an additional path for air valves. The solid lines and arrows show the possible direction of flow of the energy in the system. The dashed lines show less significant energy flow connections. For 100% pneumatic conversion efficiency, all of the energy must flow from the incoming wave (source) through to the Power Take-off (sink).

Practically speaking, not all energy in water waves can be extracted, where some energy ends up either being converted into non-useful forms (viscous losses such as boundary effects or turbulence losses such as vortex shedding), reflected from or diffracted around the WEC. The primary path of energy flow for any type of OWC WEC is from the incoming wave, into water column heave, then to the power take-off (air turbine) driven by air pressure differential between the air chamber and atmosphere. For an OWC with a bi-directional air turbine, no air valves are present so the pressure difference is driving the turbine for the entire cycle.

For the concept in which air valves are present, the water level rises during the first half of the conversion cycle, causing positive air chamber pressure. Air subsequently flows through the air valves, energy is also being stored in the form of potential energy as water column heave. As defined by Equation (1) pneumatic power is the product of air differential pressure ($\Delta p$) and air flow rate (Q). Energy lost through the air valves (and potentially PTO depending on turbine geometry) for this half of the cycle is the integral of the pneumatic power for that duration.

Since the main objective is to minimise conversion losses, power consumed by the valves must be minimised. After physical consideration of Equation (1) this is only achievable by minimising the pressure differential, since air flow should be unimpeded to enable maximum energy storage as water column heave. Practically this is achieved by maximising air valve area and utilising valves with low back pressure.

For the second half of the cycle the water level begins to fall causing air chamber negative pressure. The air valves close, resulting in all incoming wave energy plus energy stored in water column heave being available at the PTO, which in the case of the WSE concept is a bespoke unidirectional air turbine.

Figure 18:
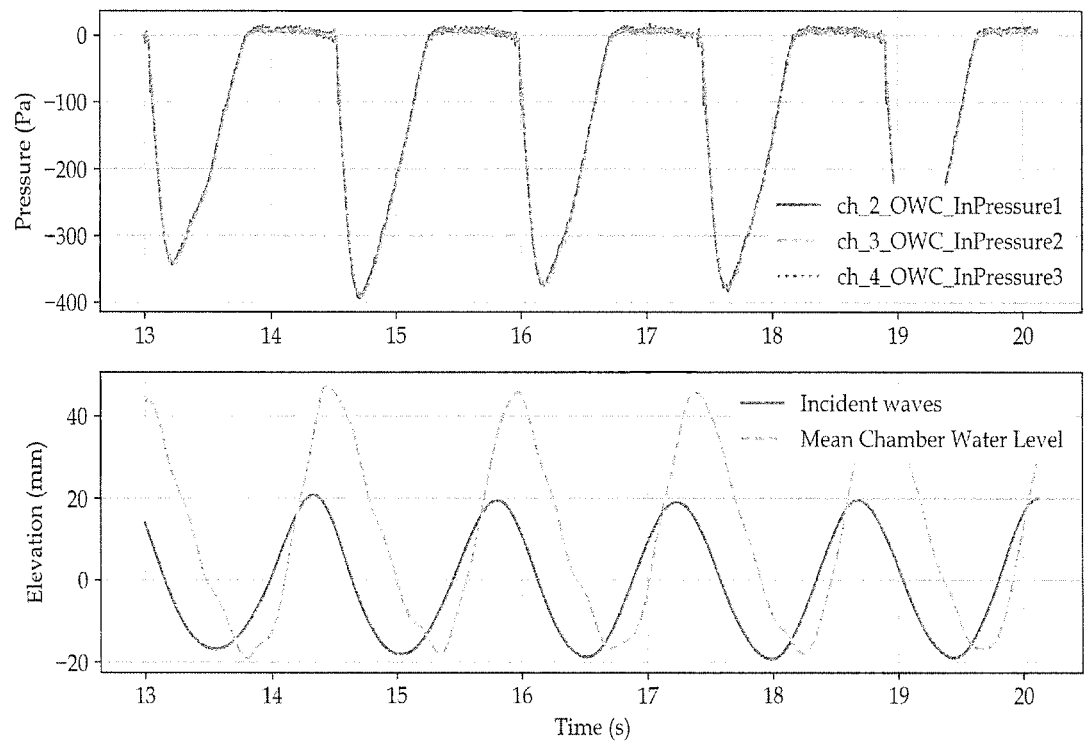
FIG. 18—From the experimental data, a time series plot of model scale air chamber pressure (upper plot); and in the lower plot: adjacent incident wave probe water level (dashed line) and mean surface elevation (solid line)

FIG. 18 is a plot of experimental data which shows the relationship between the air chamber pressure, the chamber water column heave (storage) and the passing water surface profile adjacent to the water column (incident waves). It is evident the air chamber pressure is only slightly positive while the chamber water level (minimal energy loss through air valves) is rising and is significantly negative while the chamber water level is falling.

Results

Results are presented in the following section for device power performance in head seas when exposed to both regular and irregular waves. Both full scale extrapolated results and efficiency results are presented.

Regular Wave Results

Figure 19:
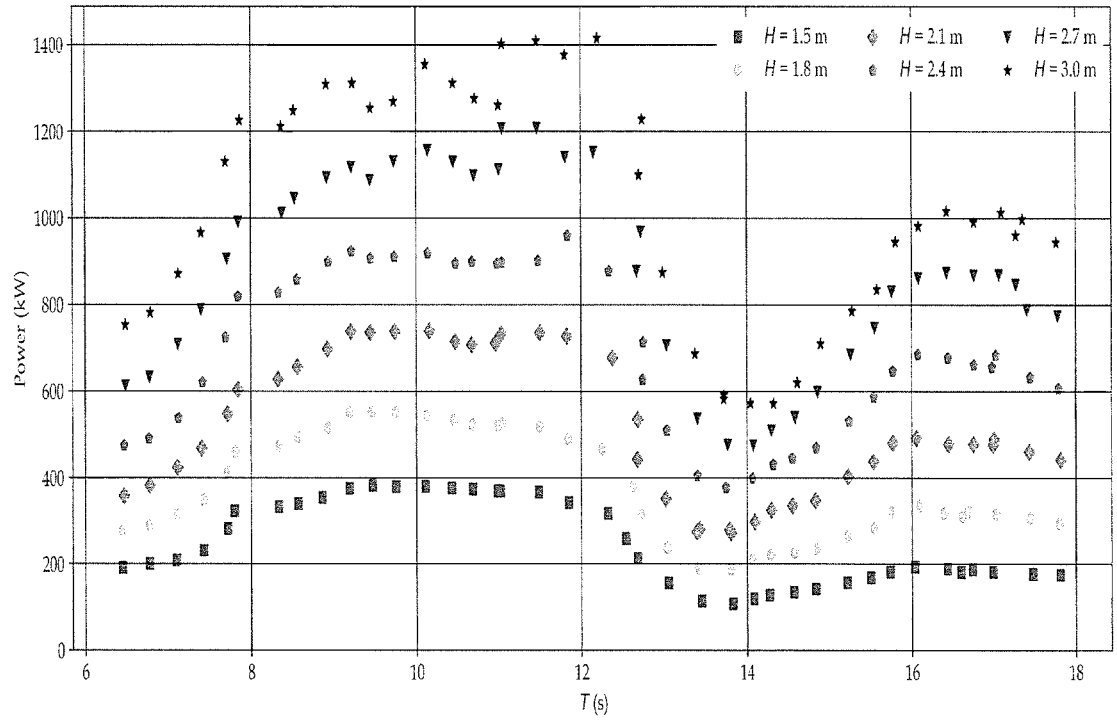
FIG. 19—From the experimental data, the pneumatic power results for the test wave energy capture device derived from regular waves (237 data points)

FIG. 19 shows regular wave pneumatic power results extrapolated to full scale. Results were compiled from 237 separate runs of the wave maker. Due to deviation in the generated wave heights from desired, a linear correction $(1+(h_p-h_A)/h_p$ where $h_p$ is desired height and $h_A$ is actual crest to trough height) to pneumatic power was applied. For the larger wave heights (2.7 and 3.0 m) the power output appears somewhat erratic, which was found to be affected by a pressure loss from the chamber as the water level in the chamber dropped sufficiently for a separate atmospheric connection between the chamber and atmosphere past the front lip.

For varying wave periods, it can be seen that there was almost a level production of pneumatic power between periods of 8 and 12 seconds, followed by a dip from 13-16 seconds and moderate increase and levelling between 16-18 seconds.

Figure 20:
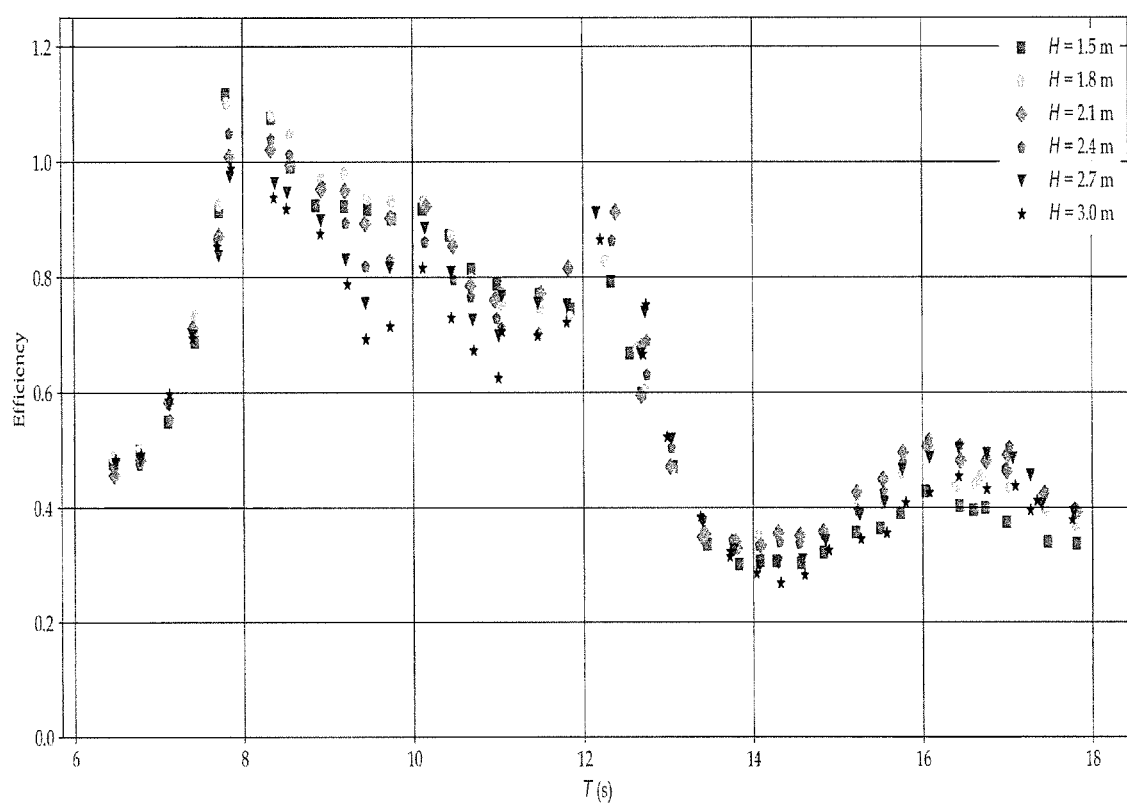
FIG. 20—From the experimental data, the pneumatic efficiency for the test wave energy capture device derived from regular waves (237 data points).

FIG. 20 shows the pneumatic efficiency of the device operating in regular waves. The peak efficiency was seen to occur at just below 8 seconds with a value of between approximately 1 and 1.1 (improving for lower wave heights). There exists a second lower peak at 12 seconds where pneumatic efficiency is approximately 0.8-0.9, this second peak was suspected to be associated with the front lip and pointed bow geometry. For wave periods above 12 seconds the efficiency drops off rapidly until levelling off after 14 seconds between 0.3 and 0.5.

Loss in efficiency for longer period waves was considered somewhat less detrimental since longer period waves also generally contain more energy than shorter period waves. But referring back to FIG. 19, there was still a significant reduction in pneumatic performance for wave periods between 13 and 15 seconds, which is something tabled for future research.

Irregular Wave Results

The predicted full scale pneumatic power matrix results were calculated from a total of 47 different wave records using a griddata function to perform 2D linear interpolation. Similar to what was found in the regular wave results; pneumatic power production was best towards the lower period waves with peak mean power production occurring between 11 and 13 second peak period ($T_p$). Similarly, efficiency is well over 0.5 for all $T_p$ up to 13 second inclusive.

Discussion

Air compressibility is known to yield lower pneumatic performance for real seas compared to Froude scale extrapolated model test results. Others have investigated the issue using a 3D numerical code and found the overestimation is in the order of 12% for a conventional OWC PTO. This simple correction can be applied to performance estimates by reducing pneumatic power extrapolated results accordingly. However, it is also known that the reduction in efficiency is a function of the air compressible volume. Since the new concept OWC of this disclosure causes the chamber water elevation to rise higher, the chamber air volume is consequently reduced. However, since the concept involves only rarefaction and not compressibility, it is likely a 12% estimate of the scaling error is somewhat extreme. In addition, we feel the conservative flow coefficient of 0.6 (instead of the calculated 0.691) is a sufficiently conservative estimate in this case to compensate for any scaling issues.

The enhanced pneumatic power production of this new technology (as illustrated in the previous sections), coupled with the turbine efficiency (averaging 77.5%) and an assumed electrical conversion efficiency of 95%, results in a noticeable improvement in output compared to previous bi-directional OWCs. When considered in conjunction with the measured wave climate at the King Island site, the pilot plant project is predicted to exhibit an average power output of 472 kW (implying a capacity factor of 47.2% for the 1 MW peak unit). Given an operational assumption of 8,500 hours per year, this will result in an annual energy production of over 4 GWh.

The wave to wire efficiency of the system is colloquially described as "power out divided by power in". The average 'power out' of the proposed King Island pilot plant device has already been estimated (see above) at 472 kW. The 'power in' is defined as the average incident wave energy density (kW per metre of wave crest) multiplied by the width of the device (in metres). A detailed assessment of the wave climate at the King Island site indicates an average incident wave energy density of 52.87 kW/m. Multiplying by the device width of 20 metres suggests an average wave power incident upon the WSE device ('power in') of 1057 kW. Therefore, the wave to wire efficiency of the WSE device is estimated as 44.6%.

This level of energy production, combined with the expected full life-cycle costs of the project, indicates a levelised cost of energy (LCOE) for this first one-off commercial project of US$0.13 per kWh. Immediate economies of scale for a multi-unit project of 25 MW or more, utilising the same technology, indicate a LCOE of under US$0.07 per kWh.

CONCLUSIONS

Details of an OWC technology, incorporating novel innovations, has been presented. The technology addresses the issue of the air rectification of an OWC for use with an efficient unidirectional air turbine. The rectification system, combined with bespoke geometry modifications, was tested at model scale in both regular and irregular waves. Performance results in irregular seas yielded a peak pneumatic efficiency of 83%. In regular waves, the peak pneumatic conversion efficiency was found to exceed 100%. This was due to the resonance of the device with the incoming waves causing a modification of the local wave field. This phenomenon results in the device drawing in more energy than is naturally incident upon the front face of the OWC.

The net result of this improvement in conversion efficiency of the new concept OWC arrangement is a commensurate reduction in the cost of energy generation. For a multiple unit wave energy project in a location with a wave climate similar to that of King Island, rigorous financial analysis suggests a LCOE in the vicinity of US$0.07. This is exceptional for an energy technology at the start of its commercialisation phase. Learning curve studies indicate this LCOE will fall further over the coming decade.

The apparatus disclosed herein has many advantages over convention power generation devices, as well as previous OWC technologies:

- It can be operated to achieve resonance with the incident wave field (matching turbine damping characteristics to the OWC);
- The column/duct dimension can be designed with optimum hydrodynamic conversion efficiency of the OWC structure (site specific OWC design for the likely incident wave field);
- The turbine performance/efficiency for the expected pressure/flow characteristics can also be optimised;
- The device can be mechanically isolated in storm conditions to prevent damage by shutting off the valves. Because of its robust construction, it will not blow away in a storm;
- The experimental performance of the Oscillating Water Column (OWC) apparatus exhibited very good energy harvesting capability over a wide range of wave frequencies, and gave a noticeable improvement in output compared to previous bi-directional OWCs;
- The simpler and more efficient unidirectional air turbine that can be safely located well above the action of the waves and protected from the elements by a concrete caisson, to survive extreme conditions. An example device will measures 20 metres by 20 metres, and are 18 metres tall. Of this, only 8 metres projects above the waterline. The generation units will generally be located some distance from shore, in ten metres of water depth.
- It is anticipated that farms (or arrays) of near-shore wave energy converters can be used. By using these devices as coastal breakwaters (or seawalls), thus providing both power and a sheltered harbour for the local community and industry while also realising significant cost-sharing and saving possibilities.
- The only moving parts in the entire technology are the turbine and some simple off-the-shelf valves, all of which are well above the water line. There are no moving parts in or below the water. This means maintenance is only ever required to be performed on the easy-to-access regions well above the ocean. The operation of many other wave-energy devices takes place underwater, which leaves them exposed to the corrosive and damaging effects of saltwater and makes them difficult to maintain or repair. The turbine and the generator are kept above the waterline, meaning there is less maintenance and any servicing can be carried out without the need for scuba equipment.
- Because there are no moving parts under water, this precludes injury to marine life. No oil or contaminants can be released.

The reliability and predictability of ocean waves is a huge advantage over solar and wind power. For example, many meteorological and surfing websites already accurately predict wave conditions as much as a week in advance—thus, this renewable source can be considered as complementary baseload power.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive. For example, the particular L-shaped form of the duct 10 shown in the drawings may be different, with the two conduits 12, 14 not necessarily orthogonal to one another. The valves 38 may be different in size, shape and total number thereof. There may be more than one turbine 44 on any particular duct 10, and these may be housed and connected to the uppermost region 36 of the second conduit 14 by other means (for example, via pipes). The materials of construction of the duct 10, whilst typically made of concrete, can also be of other materials such as hard plastics or carbon fibre, and be anchored to the base 18 at the ocean shore. While reference has been made to wave generation from the sea or an ocean, wave generation can also occur from lakes, rivers and tidal pools, all of which are suitable for using the present method and apparatus.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The invention claimed is:

1. A method of controlling the frequency of movement of water in an oscillating water column to substantially correspond to the frequency of an incoming and outgoing wave from a body of water which is in fluid communication with the column, the method comprising the steps of:
  a. arranging a duct for receiving the oscillating water column, the duct comprising:
    i. a first portion arranged in use to be substantially submerged below the mean surface level (MSL) of the body of water in which it is located, the first portion having an opening arranged for receiving the incoming wave from the body of water, and
    ii. a second portion which depends from the first portion and which is arranged in use to extend above the MSL, the second portion for receiving water from the incoming wave after it flows through the first portion,
  such that the oscillating water column is established in use within the duct as a result of repeated movement of water into and out of the duct, the flow of water out of the duct also being via the opening, but in a direction opposite to the direction of the incoming wave; and
  b. changing the configuration of at least one flow control device which is in direct fluid communication with a flow passage at an interior of the second portion of the duct which extends above the MSL, said device(s) arranged in use to move between a first configuration in which the device is open, allowing a flow of displaced air to exit the flow passage in the second portion when the oscillating water column is being received into the duct, and a second configuration in which the device restricts air flowing therethrough into the flow passage in the second portion;
  such that the frequency of the oscillating water column which flows into and out of the duct substantially corresponds to the frequency of the incoming and outgoing wave from the body of water; and
  wherein to improve the operation of the oscillating water column, an entry mouth at an opening of the conduit in the first portion is arranged in use to partially extend above the MSL of a body of water in which it is located, so as to capture a greater flow of incoming waves from the body of water into the duct.

2. The method as claimed in claim 1, further comprising the step of continuously adjusting the configuration of one or more flow control device(s) in response to changes in the frequency of the incoming and outgoing wave, by means of a control mechanism.

3. The method as claimed in claim 2, wherein in use the control mechanism selectively moves one or more of the flow control device(s) between the first and second configurations.

4. The method as claimed in claim 3, wherein in use, one or more of the flow control device(s) also change(s) the configuration of access to the flow passage in response to changes in the pressure and/or direction of flow of the oscillating water column.

5. The method as claimed in claim 1, wherein for the second configuration, a flow of air enters the flow passage via a turbine which is arranged in direct fluid communication with the flow passage.

6. The method as claimed in claim 5, wherein for the second configuration, the flow control device is fully closable, which in use facilitates the flow of air solely via the turbine.

7. The method as claimed in claim 5, wherein the use of the control mechanism moves an element of the flow control device, causing said device to become open and closed to the flow of air, the element being one of hingedly, slidably or rotatably moveable and of a shape which covers a cross-sectional opening passage of the flow control device.

8. The method as claimed in claim 5, wherein for the second configuration, the turbine is arranged to facilitate unidirectional rotation of a turbine rotor in response to a unidirectional axial flow of air.

9. The method as claimed in claim 8, wherein for the second configuration, an electric generator is configured for rotation by the turbine rotor to generate electrical energy.

10. The method as claimed in claim 1, wherein in use the operation of the oscillating water column into and out of the duct occurs within an internal conduit defined within each of the first and second portions, each of said internal conduits being arranged in fluid communication with one another, and with the flow passage.

11. The method as claimed in claim 1, wherein to improve the operation of the oscillating water column in use, the first portion has a greater cross-sectional area at the opening than the remainder of the first portion, the conduit tapering down in cross-sectional area when moving in a direction from the entry mouth at the opening toward the second portion, so as to accelerate the flow of incoming waves from the body of water into the duct.

12. The method as claimed in claim 1, wherein to improve the operation of the oscillating water column in use, an uppermost surface of the first portion slopes downwardly when moving in a direction from the entry mouth at the opening toward the second portion.

13. A method of controlling the frequency of movement of water in an oscillating water column to substantially correspond to the frequency of an incoming and outgoing wave from a body of water which is in fluid communication with the column, the method comprising the steps of:
  a. arranging a duct for receiving the oscillating water column, the duct comprising:
    i. a first portion arranged in use to be substantially submerged below the mean surface level (MSL) of the body of water in which it is located, the first portion having an opening arranged for receiving the incoming wave from the body of water, and
    ii. a second portion which depends from the first portion and which is arranged in use to extend above the MSL, the second portion for receiving water from the incoming wave after it flows through the first portion,
    such that the oscillating water column is established in use within the duct as a result of repeated movement of water into and out of the duct, the flow of water out of the duct also being via the opening, but in a direction opposite to the direction of the incoming wave; and
  b. changing the configuration of at least one flow control device which is in direct fluid communication with a flow passage at an interior of the second portion of the duct which extends above the MSL, said device(s) arranged in use to move between a first configuration in which the device is open, allowing a flow of displaced air to exit the flow passage in the second portion when the oscillating water column is being received into the duct, and a second configuration in which the device restricts air flowing therethrough into the flow passage in the second portion;
    such that the frequency of the oscillating water column which flows into and out of the duct substantially corresponds to the frequency of the incoming and outgoing wave from the body of water; and
    wherein the frequency of the oscillating water column in use can be varied by the step of changing the cross-sectional area of the flow control device(s) as a proportion of the surface area of the second portion which extends above the MSL, by the selective movement of one or more of the flow control device(s) between the first and second configurations.

14. The method as claimed in claim 13, wherein the open cross-sectional area of the flow control device(s) as a proportion of the surface area of the second portion which extends above the MSL, is arranged to be less than 15 percent.

* * * * *